(12) United States Patent
Li et al.

(10) Patent No.: US 12,558,675 B2
(45) Date of Patent: Feb. 24, 2026

(54) DISPROPORTIONATION AND TRANSALKYLATION CATALYST, AND PREPARATION AND APPLICATION THEREOF

(71) Applicants: CHINA PETROLEUM & CHEMICAL CORPORATION, Beijing (CN); SHANGHAI RESEARCH INSTITUTE OF PETROCHEMICAL TECHNOLOGY, SINOPEC, Shanghai (CN)

(72) Inventors: Jingqiu Li, Shanghai (CN); Jian Ding, Shanghai (CN); Yanan Wu, Shanghai (CN); Dejin Kong, Shanghai (CN)

(73) Assignees: CHINA PETROLEUM & CHEMICAL CORPORATION, Beijing (CN); SHANGHAI RESEARCH INSTITUTE OF PETROCHEMICAL TECHNOLOGY, SINOPEC, Shanghai (CN)

( * ) Notice: Subject to any disclaimer, the term of this patent is extended or adjusted under 35 U.S.C. 154(b) by 458 days.

(21) Appl. No.: 18/246,713

(22) PCT Filed: Sep. 26, 2021

(86) PCT No.: PCT/CN2021/120641
§ 371 (c)(1),
(2) Date: Mar. 27, 2023

(87) PCT Pub. No.: WO2022/063266
PCT Pub. Date: Mar. 31, 2022

(65) Prior Publication Data
US 2023/0364593 A1 Nov. 16, 2023

(30) Foreign Application Priority Data

Sep. 27, 2020 (CN) .......................... 202011034477.3
Sep. 27, 2020 (CN) .......................... 202011036008.5

(51) Int. Cl.
*B01J 29/26* (2006.01)
*B01J 29/48* (2006.01)
(Continued)

(52) U.S. Cl.
CPC ............... *B01J 29/26* (2013.01); *B01J 29/48* (2013.01); *B01J 29/7815* (2013.01);
(Continued)

(58) Field of Classification Search
CPC ........ B01J 27/14; B01J 29/076; B01J 29/166; B01J 29/22; B01J 29/26; B01J 29/48;
(Continued)

(56) References Cited

U.S. PATENT DOCUMENTS

2005/0266979 A1 12/2005 Boldingh et al.
2008/0064588 A1* 3/2008 Boldingh ................ C07C 6/126
502/64
(Continued)

FOREIGN PATENT DOCUMENTS

CN 1122571 A 5/1996
CN 1259930 A 7/2000
(Continued)

OTHER PUBLICATIONS

Niwa, M. et al., 1997, Catalysis Surveys from Japan, 1, 215-226. (Year: 1997).*
(Continued)

*Primary Examiner* — Brian A McCaig
(74) *Attorney, Agent, or Firm* — NKL Law; Allen Xue

(57) ABSTRACT
A disproportionation and transalkylation catalyst can be used in the catalytic conversion of alkyl aromatic hydrocar-
(Continued)

Example I-1

Comparative Example I-1 bons. The catalyst contains an acidic molecular sieve, a first metal component immobilized on the acidic molecular sieve and an oxide additive. The first metal contained in the first metal component is at least one selected from the group of Group VB metals, Group VIB metals and Group VIIB metals, the catalyst has a medium strong acid content of 0.05-2.0 mmol/g of catalyst, and a ratio of the medium strong acid content to the total acid content of 60-99%. When used in the catalytic conversion of alkyl aromatic hydrocarbons, the catalyst exhibits high reaction activity, low aromatic hydrocarbon loss rate.

20 Claims, 3 Drawing Sheets

(51) Int. Cl.

| | | |
|---|---|---|
| *B01J 29/78* | (2006.01) | |
| *B01J 29/85* | (2006.01) | |
| *B01J 35/60* | (2024.01) | |
| *B01J 37/02* | (2006.01) | |
| *B01J 37/08* | (2006.01) | |

(52) U.S. Cl.
CPC ....... *B01J 29/7869* (2013.01); *B01J 29/7876* (2013.01); *B01J 29/85* (2013.01); *B01J 35/60* (2024.01); *B01J 37/0201* (2013.01); *B01J 37/0236* (2013.01); *B01J 37/08* (2013.01); *B01J 2229/18* (2013.01); *B01J 2229/30* (2013.01)

(58) Field of Classification Search
CPC ............... B01J 29/7815; B01J 29/7869; B01J 29/7876; B01J 29/80; B01J 29/85; B01J 35/19; B01J 35/396; B01J 35/60; B01J 37/0201; B01J 37/0236; B01J 37/08; B01J 37/18; B01J 2229/18; B01J 2229/186; B01J 2229/30; B01J 2229/42; C07C 6/12; C07C 6/126; C07C 15/04; C07C 15/08
See application file for complete search history.

(56) References Cited

U.S. PATENT DOCUMENTS

| | | |
|---|---|---|
| 2010/0029467 A1 | 2/2010 | Inui et al. |
| 2012/0083636 A1* | 4/2012 | Boldingh ................. B01J 37/20 |
| | | 585/475 |
| 2019/0275503 A1* | 9/2019 | Kanthasamy .......... B01J 35/391 |
| 2019/0308176 A1 | 10/2019 | Zuidema et al. |

FOREIGN PATENT DOCUMENTS

| | | |
|---|---|---|
| CN | 101534946 A | 9/2009 |
| CN | 102688770 A | 9/2012 |
| CN | 103120952 A | 5/2013 |
| CN | 108499595 A | 9/2018 |
| CN | 108499597 A | 9/2018 |
| RU | 2217402 C2 | 11/2003 |

OTHER PUBLICATIONS

Mirzaliyeva, Sakina E. et al.; "Acid and Catalytic Properties of Bimetallic Catalysts on the Basis of ZSM-5 Type Zeolite in the Refining of Straight-Run Gasoline"; Oil and Gas Business; 2019, No. 4, pp. 155-172.

Benaliouche, F. et al.; "NH3-TPD and FTIR spectroscopy of pyridine adsorption studies for characterization of Ag- and Cu-exchanged X zeolites"; Microporous and Mesoporous Materials, 2008, vol. 111, N 1-3, pp. 80-88.

КОЛЕСНИКОВ И.М. et al.; "Solid catalysts, their structure, composition and catalytic activity"; 2000, p. 10.

БОРЕСКОВ Г.К., "Heterogeneous analysis"; 1986, p. 5 & 15.

Ali, S. A. et al.; "Parametric study of dealkylation-transalkylation reactions over mordenite-based bi-functional catalysts"; Applied Catalysis A: General; vol. 393; Year: 2011; pp. 96-108.

Database WPI Week 201867; Thomson Scientific, London GB; AN 2018-72470T, XP002811176; -&CN108499597A; Sep. 7, 2018; pp. 1-3.

Examiner; Saudi Authority for Intellectual Property Substantive Examination Report for Application No. 523440119; Jan. 25, 2024; pp. 1-10.

* cited by examiner

Example I-1

Comparative Example I-1

DISPROPORTIONATION AND TRANSALKYLATION CATALYST, AND PREPARATION AND APPLICATION THEREOF

TECHNICAL FIELD

The present application relates to the field of catalysts, particularly to a disproportionation and transalkylation catalyst, its preparation and application thereof.

BACKGROUND ART

The method for increasing the production of xylene by using the transalkylation reaction between toluene and heavy aromatic hydrocarbons of C9 and higher ($C_9^+A$) is an effective method for increasing the production of xylene by using heavy aromatic hydrocarbons and is widely used. The reaction network between toluene and $C_9^+A$ is complicated, and the dealkylation and lightening, the disproportionation and transalkylation, and hydrocracking of benzene ring of heavy aromatics and the like are involved. The above reactions are acid-catalyzed reactions and must be carried out under the action of the acid center of molecular sieves. In addition, it is found in research that certain metal components can be introduced into a catalyst to improve the conversion efficiency of the catalyst and improve the carbon deposition resistance of the catalyst. The metal component can promote the rapid hydrogenation saturation of olefin intermediates, accelerate the reaction of dealkylation and the like, improve the conversion efficiency of heavy aromatics, but simultaneously the metal component may also aggravate the hydrogenation saturation of aromatics. Metals such as platinum, palladium, rhenium, molybdenum and the like are commonly used as hydrogenation metal components, different metals have different impact on the reaction. Metal with excessive hydrogenation capacity will increase the side reaction of aromatic hydrogenation and the loss rate of aromatic rings; and metals with poor hydrogenation capacity show no obvious promotion effect on the main reaction. The selection of a suitable metallic additive is critical to the synthesis of catalysts.

CN102688770A discloses an aromatic hydrocarbon hydrogenation catalyst, which comprises mesoporous zeolite and noble metal, the noble metal is selected from platinum, palladium, rhodium, silver, ruthenium, gold, and the like. The catalyst is prepared using a post treatment method, in which a mesoporous zeolite with properties of mesoporous materials is prepared using a soft template or a hard template, the resulting mesoporous zeolite is treated by ammonium nitrate ion exchange and roasting to obtain a catalyst carrier, then the catalyst carrier is impregnated with noble metal component, thereby improving the hydrodearomatization activity and sulfur resistance of the catalyst.

CN1259930A discloses a reaction process involving a double-layer catalyst, wherein the catalyst in the upper layer is a zeolite comprising a Group VIIIB metal that is selected from MCM-22, ZSM-12, Beta, PSH-3 and SSZ-25 zeolites, and the catalyst in the lower layer is a ZSM-5 molecular sieve, reactants are firstly passed through the upper layer of catalyst to produce xylene and benzene intermediate products, and then passed through the second layer of catalyst to purify the benzene product.

CN1122571 discloses a noble metal-containing molecular sieve catalyst suitable for treating feedstocks with a high $C_9^+A$ content, which comprises a carrier comprising $10^{-80}$ wt % of mordenite or R zeolite and 0-70 wt % of ZSM-5, and 5-90 wt % of gamma-$Al_2O_3$, and 0.001-0.5 parts by weight of platinum and 0.01-10.0 parts by weight of tin or 0.01-7.0 parts by weight of lead supported on the carrier.

However, aromatic hydrocarbon conversion catalysts known in the prior art have the problems of low conversion efficiency, high hydrogenation by-products, etc., and thus there is still a need for a novel catalyst which can at least partially solve the above problems.

SUMMARY OF THE INVENTION

An object of the present application is to provide a novel disproportionation and transalkylation catalyst, its preparation and application thereof, which catalyst is suitable for catalytic conversion of alkyl aromatic hydrocarbons, such as disproportionation reaction and transalkylation reaction of alkyl aromatic hydrocarbons, especially for the reaction for producing xylene by using toluene and/or $C_9^+$ alkyl aromatic hydrocarbons as starting materials, and has the advantages of high conversion efficiency, low side reaction of aromatic hydrocarbon hydrogenation, and high product selectivity.

To achieve the above object, in an aspect, the present application provides a disproportionation and transalkylation catalyst, comprising an acidic molecular sieve, a first metal component immobilized on the acidic molecular sieve, and an oxide additive, wherein the first metal contained in the first metal component is at least one selected from the group consisting of Group VB metals, Group VIB metals, and Group VIIB metals, the catalyst has a medium strong acid content of 0.05-2 mmol/g of catalyst, and a ratio of the medium strong acid content to the total acid content of 60-99%.

Preferably, the first metal is at least one selected from Mo, W and Re, more preferably a combination of at least two of Mo, Re and W, and particularly preferably a combination of three of Mo, Re and W.

Preferably, the catalyst further comprises a second metal component different from the first metal component, and the second metal component is preferably immobilized on the oxide additive.

Further preferably, the second metal in the second metal component is at least one selected from the group consisting of Group IA, Group IIA, Group IIIA, Group IVA, Group VA, Group IVB and lanthanide series metals.

In another aspect, there is provided a method for preparing the disproportionation and transalkylation catalyst according to the present application, comprising the steps of:

1) loading a first metal source and an optional phosphorus source onto an acidic molecular sieve source, and carrying out a first heat treatment to obtain a modified molecular sieve; and 2) shaping the modified molecular sieve with an oxide additive source, and optionally carrying out a post treatment to obtain the catalyst.

In yet another aspect, there is provided a use of the disproportionation and transalkylation catalyst according to the present application in the catalytic conversion of alkyl aromatic hydrocarbons, including disproportionation reactions of alkyl aromatic hydrocarbons, transalkylation reactions of alkyl aromatic hydrocarbons, or a combination thereof.

In yet another aspect, there is provided a process for the catalytic conversion of alkyl aromatic hydrocarbons, comprising the step of contacting a feedstock comprising an alkyl aromatic hydrocarbon with the disproportionation and transalkylation catalyst according to the present application for reaction in the presence of hydrogen.

The catalyst of the present application has one or more of the following characteristics:

1) In the catalyst of the present application, an active metal component comprising Group VB, Group VIB and/or Group VIIB metals is used and immobilized on an acidic molecular sieve, and due to the hydrogen migration effect of the metal surface and the synergistic effect of the metal surface and the acid site of the molecular sieve, the metal component loaded on the surface of the acidic molecular sieve can preferentially cover or weaken a part of the strong acid center and exhibit a synergistic effect with the acid site of nearby molecular sieve(s), so that the effects of promoting the conversion efficiency of aromatic hydrocarbons and reducing the hydrogenation side reaction can be achieved, and the catalyst has the advantages of high reaction activity, low aromatic hydrocarbon loss and the like;

2) in preferred embodiments of the catalyst according to the present application, two metal components are used, and the distribution of the supported metals on the catalyst is regulated and controlled depending on the influence of different metal components on the conversion reaction process of aromatic hydrocarbons, wherein the first metal component with higher hydrogenation function is loaded on the surface of the acidic molecular sieve to enhance the conversion efficiency of aromatic hydrocarbons, and the second metal component is preferably loaded on the oxide additive to inhibit the hydrogenation saturation side reaction of aromatic hydrocarbons on the surface of the oxide additive, and thereby, when used in the conversion reaction of aromatic hydrocarbons, the conversion efficiency and the selectivity to the target product of the catalyst can be greatly improved; and 3) when the catalyst of the present application is used in the reaction for producing xylene and benzene from toluene and $C_9^+$ aromatic hydrocarbons, the catalyst shows the advantages of low hydrogenation side reaction of aromatic hydrocarbons and high xylene selectivity.

Other characteristics and advantages of the present application will be described in detail in the detailed description hereinbelow.

BRIEF DESCRIPTION OF THE DRAWINGS

The drawings, forming a part of the present description, are provided to help the understanding of the present application, and should not be considered to be limiting. The present application can be interpreted with reference to the drawings in combination with the detailed description hereinbelow. In the drawings.

DETAILED DESCRIPTION OF THE INVENTION

Figure 1A:
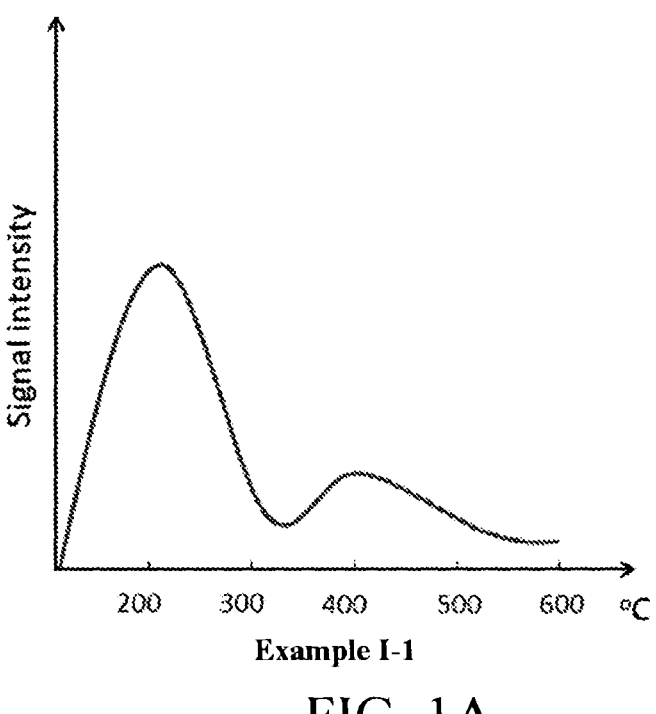
FIGS. 1A and 1B show $NH_3$-TPD patterns of the catalysts obtained in Example I-1 and Comparative Example I-1 of the present application, respectively.

The present application will be further described hereinafter in detail with reference to the drawing and specific embodiments thereof. It should be noted that the specific embodiments of the present application are provided for illustration purpose only, and are not intended to be limiting in any manner.

Any specific numerical value, including the endpoints of a numerical range, described in the context of the present application is not restricted to the exact value thereof, but should be interpreted to further encompass all values close to said exact value, for example all values within ±5% of said exact value. Moreover, regarding any numerical range described herein, arbitrary combinations can be made between the endpoints of the range, between each endpoint and any specific value within the range, or between any two specific values within the range, to provide one or more new numerical range(s), where said new numerical range(s) should also be deemed to have been specifically described in the present application.

Unless otherwise stated, the terms used herein have the same meaning as commonly understood by those skilled in the art; and if the terms are defined herein and their definitions are different from the ordinary understanding in the art, the definition provided herein shall prevail.

In the present application, the term "acidic molecular sieve" has the meaning commonly understood in the art and refers to a molecular sieve having B acid and/or L acid sites.

In the present application, the term "$C_8$ aromatic hydrocarbon (or $C_8A$)" refers to aromatic hydrocarbons having 8 carbon atoms or mixtures thereof, such as xylene; similarly, the term "$C_9$ aromatic hydrocarbon (or $C_9A$)" refers to aromatic hydrocarbons having 9 carbon atoms or mixtures thereof, such as propylbenzene, methylethylbenzene, trimethylbenzene, and the like.

In the present application, the term "$C_9^+$ aromatic hydrocarbon (or $C_9^+A$)" refers to aromatic hydrocarbons having 9 and more carbon atoms or mixtures thereof, and similarly the term "$C_{10}^+$ aromatic hydrocarbons (or $C_{10}^+A$)" refers to aromatic hydrocarbons having 10 and more carbon atoms or mixtures thereof. For example, $C_{10}^+$ alkyl aromatic hydrocarbons include, but are not limited to, diethylbenzene, dimethylethylbenzene, methylpropylbenzene, tetramethylbenzene, methylnaphthalene, dimethylnaphthalene, and the like.

In the present application, the medium strong acid content of the catalyst is calculated according to the peak area within a temperature range of 200-400° C. of its $NH_3$-TPD pattern; the ratio of the medium strong acid content to the total acid content refers to the ratio of the peak area within a temperature range of 200-400° C. to the total peak area within a temperature range of 100-600° C. of the $NH_3$-TPD pattern.

In the context of the present application, in addition to those matters explicitly stated, any matter or matters not mentioned are considered to be the same as those known in the art without any change. Moreover, any of the embodiments described herein can be freely combined with another one or more embodiments described herein, and the technical solutions or ideas thus obtained are considered as part of the original disclosure or original description of the present application, and should not be considered to be a new matter that has not been disclosed or anticipated herein, unless it is clear to the person skilled in the art that such a combination is obviously unreasonable.

All of the patent and non-patent documents cited herein, including but not limited to textbooks and journal articles, are hereby incorporated by reference in their entirety.

As described above, in a first aspect, the present application provides a disproportionation and transalkylation catalyst, comprising an acidic molecular sieve, a first metal component immobilized on the acidic molecular sieve, and an oxide additive, wherein the first metal contained in the first metal component is at least one selected from Group VB metals, Group VIB metals, and Group VIIB metals, and the catalyst has a medium strong acid content of 0.05-2 mmol/g of catalyst, and a ratio of the medium strong acid content to the total acid content of 60 to 99%.

In the catalyst according to the present application, due to the hydrogen migration effect of the metal surface and the synergistic effect of the metal surface and the acid site of the molecular sieve, the metal component loaded on the surface of the acidic molecular sieve can preferentially cover or weaken a part of the strong acid center and exhibit a synergistic effect with the acid site of nearby molecular sieve(s), so that the effects of promoting the conversion efficiency of aromatic hydrocarbons and reducing the hydrogenation side reaction can be achieved.

In a preferred embodiment, the catalyst has a medium strong acid content of 0.1-1 mmol/g, and a ratio of the medium strong acid content to the total acid content of 70-90%.

In a preferred embodiment, the percentage increase of ammonia desorption amount of the acidic molecular sieve at 200-400° C. after the immobilization of the first metal component is 0.5-20%, based on the ammonia desorption amount of the acidic molecular sieve at 200-400° C. under normal pressure. In the present application, the increase of the ammonia desorption amount of the acidic molecular sieve at the temperature of 200-400° C. indicates that the amount of the medium strong acid required by the catalyst of the present application is increased, which is beneficial to the improvement of the reaction efficiency and the selectivity to xylene.

In the catalyst of the present application, the first metal is present in the catalyst in the form of a metal element, a metal oxide, or a combination thereof. In a preferred embodiment, the first metal component is immobilized on the acidic molecular sieve through physical mixing and/or chemical bonding.

In a preferred embodiment, the catalyst of the present application can be produced by: loading the first metal component on the acidic molecular sieve, and then shaping by kneading the resultant with the oxide additive. In the embodiment, the first metal component is loaded on the molecular sieve and then shaped by kneading with the oxide additive, and due to the synergistic effect of the metal and the acid center of the molecular sieve and the modulation effect of the metal on acidity, and by providing a specific distribution of the metal supported on the catalyst, the strong acid center of the molecular sieve can be effectively reduced and the medium strong acid center of the molecular sieve can be effectively increased, thereby promoting the conversion efficiency of aromatic hydrocarbons, improving the selectivity of products such as xylene and inhibiting the side reaction of hydrocracking of aromatic hydrocarbons.

In a preferred embodiment, based on the total weight of the catalyst, the catalyst comprises 40 to 90 wt % of the acidic molecular sieve, 5 to 40 wt % of the oxide additive, and 0.01 to 20 wt %, calculated as metal element, of the first metal component.

According to the present application, the first metal contained in the first metal component is at least one selected from the group consisting of Group VB, Group VIB and Group VIIB metals, preferably at least one of Mo, W and Re, more preferably at least two of Mo, Re and W, with a mixing ratio by weight of the two, calculated as metal element, of 0.1-10:1; particularly preferably a combination of Mo, Re and W, with a weight ratio of Mo, Re and W, calculated as metal element, of 1:0.1-0.4:0.1-0.6. In preferred embodiments of the present application, a combination of at least two of Mo, Re, and W can further stabilize the metal component and reduce the adverse effects of migration during heat treatment of the metal oxide on the structure of the molecular sieve.

In the present application, the acidic molecular sieve can be selected within a wide range, and all conventional acidic molecular sieves can be used. In a preferred embodiment, the acidic molecular sieve is selected from acidic molecular sieves having the characteristics of eight-, ten- or twelve-membered ring pore structure, or a combination thereof, more preferably selected from ZSM-5, SAPO-11, MCM-22, MOR, Beta, ZSM-12, Y molecular sieves, or a combination thereof, and particularly preferably selected from ZSM-5, MCM-22, MOR, ZSM-12 molecular sieves, or a combination thereof.

In the present application, the oxide additive can be selected within a wide range, and all conventional oxide additives can be used in the catalyst of the present application, and are preferably selected from alumina, silica, magnesia, titania, zirconia, kaolin, or combinations thereof.

In a preferred embodiment, the catalyst further comprises phosphorus, which is preferably immobilized on the acidic molecular sieve through physical mixing and/or chemical bonding, and more preferably present in an amount of 0.1 to 5 wt %, calculated as $P_2O_5$ and based on the total weight of the catalyst. In this preferred embodiment, the phosphorus-containing compound can further optimize the surface acidity of the molecular sieve on the one hand, and can inhibit strong interaction between the metal component and the molecular sieve on the other hand, thereby improving the reducibility of the metal component.

In a preferred embodiment, the catalyst of the present application further comprises a second metal component different from the first metal component, the second metal being present in the catalyst in the form of metal element, metal oxide or a combination thereof. Further preferably, the second metal component is immobilized on the oxide additive, for example through physical mixing and/or chemical bonding.

In the present application, it has been found for the first time that, based on the influence of different hydrogenation metal components on the conversion reaction process of aromatic hydrocarbons, by optimizing the microscopic distribution of metal components on the catalyst, and combining the advantages of different metals, a better catalytic performance can be achieved, in which, on one hand, an efficient conversion of aromatic hydrocarbons can be realized, and on the other hand, the hydrogenation saturation of aromatic hydrocarbons can be reduced. Specifically, the first metal component with higher hydrogenation capacity (such as Groups VB, VIB and VIIB metals) is loaded on the surface of the acidic molecular sieve to play a role in promoting the conversion efficiency of aromatic hydrocarbons, while the second metal component is loaded on the oxide additive to inhibit the hydrogenation saturation side reaction of aromatic hydrocarbons on the surface of the oxide additive. Therefore, when used in the conversion reaction of aromatic hydrocarbons, the conversion efficiency and the selectivity to target product of the catalyst of the present application can be greatly improved.

In the present application, the kind of the second metal can be selected within a wide range, and in a preferred embodiment, the second metal in the second metal component is at least one selected from the group consisting of Group IA, Group IIA, Group IIIA, Group IVA, Group VA, Group IVB and lanthanide series metals, more preferably at least one selected from Sr, Bi, Ce, Zr and Ge.

In a further preferred embodiment, based on the total weight of the catalyst, the catalyst comprises from 40 to 90 wt % of the acidic molecular sieve, from 5 to 40 wt % of the oxide additive, from 0.01 to 20 wt %, calculated as metal element, of the first metal component and from 0.01 to 20 wt %, calculated as metal element, of the second metal component.

In a still further preferred embodiment, based on the total weight of the catalyst, the catalyst comprises from 50 to 80 wt % of the acidic molecular sieve, from 10 to 30 wt % of the oxide additive, from 0.05 to 18 wt %, calculated as metal element, of the first metal component and from 0.05 to 18 wt %, calculated as metal element, of the second metal component.

In some preferred embodiments, the catalyst has a molar ratio of Bronsted acid content to Lewis acid content (B/L) value of 10:1 to 0.5:1, more preferably 9:1 to 2:1.

In a second aspect, there is provided a method for preparing the disproportionation and transalkylation catalyst according to the present application, comprising the steps of:
1) loading a first metal source and an optional phosphorus source onto an acidic molecular sieve source, and carrying out a first heat treatment to obtain a modified molecular sieve; and
2) shaping the modified molecular sieve with an oxide additive source, and optionally carrying out a post treatment to obtain the catalyst.

In the present application, said loading of step 1) may be carried out by various conventional loading methods, including but not limited to impregnation, direct mixing, precipitation, spray coating, etc. In a preferred embodiment, said loading of step 1) comprises impregnating said acidic molecular sieve source with a solution comprising the first metal source and the optional phosphorus source. In the present application, the impregnation may be isovolumetric impregnation or supersaturated impregnation, preferably supersaturated impregnation.

In a preferred embodiment, the first heat treatment of step 1) comprises roasting or a combination of drying and roasting.

In the present application, the drying conditions can be selected within a wide range, and conventional drying conditions can be used in the present application, and the preferred drying temperature can be 50-200° C., and the drying time can be adjusted depending on the temperature, and is preferably 1-30 h.

In the present application, the calcination conditions can be selected within a wide range, and conventional calcination conditions can be used in the present application, and the preferred calcination temperature is 300-700° C., and the calcination time can be adjusted depending on the temperature, preferably 1-30 hours.

In a preferred embodiment, the calcination is carried out in an oxygen-containing atmosphere, which may be, for example, an air atmosphere. In a further preferred embodiment, the oxygen-containing atmosphere is a mixed gas of air and steam at a volume ratio of 5-100:1.

According to the present application, the kind of the first metal source can be selected within a wide range, for example, the first metal source can be a soluble compound of the first metal, of which the selection is as described above, and all types of conventional soluble compounds can be used in the present application, and will not be described herein in detail.

According to the present application, the phosphorus source can be selected within a wide range, and is preferably soluble compounds containing phosphorus, such as phosphoric acid and soluble phosphates, the type of which is not particularly limited and will not be described in detail here.

According to the present application, the acidic molecular sieve source can be selected within a wide range, and is preferably selected from acidic molecular sieves having the characteristics of eight-, ten- or twelve-membered ring pore structure, or a combination thereof, more preferably selected from ZSM-5, SAPO-11, MCM-22, MOR, Beta, ZSM-12, Y molecular sieves, or a combination thereof, particularly preferably selected from ZSM-5, MCM-22, MOR, ZSM-12 molecular sieves, or a combination thereof.

According to the present application, the oxide additive source may be selected, for example, from alumina, silica, magnesia, titania, zirconia, kaolin, or combinations thereof.

In a preferred embodiment, the method of the present application further comprises, prior to step 2), loading a second metal source on said oxide additive source and optionally carrying out a second heat treatment to obtain a modified oxide additive source. In the present application, said loading of step 2) may be carried out by various conventional loading methods, including but not limited to impregnation, direct mixing, precipitation, spray coating, etc. Further preferably, said loading the second metal source on the oxide additive source comprises impregnating the oxide additive source with a solution comprising the second metal source.

According to the present application, the kind of the second metal source can be selected within a wide range, for example, the second metal source can be a soluble compound of the second metal, of which the selection is as described above, and all types of conventional soluble compounds can be used in the present application, and will not be described in detail herein again.

In a preferred embodiment, the second heat treatment comprises roasting or a combination of drying and roasting. The drying conditions can be selected within a wide range, and conventional drying conditions can be used, the preferred drying temperature can be 50-200° C., and the drying time can be adjusted depending on the temperature, and is preferably 1-30 h. The calcination conditions can be selected within a wide range, and conventional calcination conditions can be used, the preferred calcination temperature is 300-700° C., and the calcination time can be adjusted depending on the temperature, and is preferably 1-30 hours. In a further preferred embodiment, the calcination is carried out in an oxygen-containing atmosphere, which may be, for example, an air atmosphere. In a further preferred embodiment, the oxygen-containing atmosphere is a mixed gas of air and steam at a volume ratio of 5-100:1.

In a preferred embodiment, said post treatment of step 2) comprises roasting at 300-600° C. for 1-30 hours in an oxygen-containing atmosphere.

The catalyst of the present application may be reduced as necessary before use. Thus, in some preferred embodiments, the post treatment of step 2) may further comprise a reduction step. The reduction step is not particularly limited in the present application and can be carried out in a conventional manner, and will not be described in detail herein.

In a third aspect, there is provided the use of the disproportionation and transalkylation catalyst according to the present application in the catalytic conversion of alkyl aromatic hydrocarbons, including disproportionation reactions of alkyl aromatic hydrocarbons, transalkylation reactions of alkyl aromatic hydrocarbons, or a combination thereof.

In a fourth aspect, there is provided a process for the catalytic conversion of alkyl aromatic hydrocarbons, comprising the step of contacting a feedstock comprising an alkyl aromatic hydrocarbon with the disproportionation and transalkylation catalyst according to the present application for reaction in the presence of hydrogen.

In the present application, the alkyl aromatic hydrocarbon preferably comprises toluene, $C_9^+$ alkyl aromatic hydrocarbon, or a combination thereof.

In a preferred embodiment, the conditions of the contacting include: a reaction temperature of 250-500° C., a reaction pressure of 1.5-6.5 MPa, a hydrogen-to-hydrocarbon molar ratio of 1-10, and a weight space velocity of the feed of 0.5-5.

In some preferred embodiments, the present application provides the following technical solutions:

1. A disproportionation and transalkylation catalyst, comprising an acidic molecular sieve component, an oxide additive, a first metal and/or a first metal oxide, and a second metal and/or a second metal oxide, wherein the first metal is one or more selected from the group consisting of Group VB, VIB and VIIB metals, and the second metal is a metal component different from the first metal; the first metal and/or first metal oxide is/are immobilized on the acidic molecular sieve component.

2. The catalyst according to Item 1, wherein, the first metal and/or first metal oxide is/are immobilized on the acidic molecular sieve component through physical mixing and/or chemical bonding; and the second metal and/or second metal oxide is/are immobilized on the oxide additive through physical mixing and/or chemical bonding.

3. The catalyst according to Item 1 or 2, wherein, the catalyst is prepared by a method comprising: immobilizing the first metal and/or first metal oxide on the acidic molecular sieve, and immobilizing the second metal and/or second metal oxide on the oxide additive; then shaping the two through kneading.

4. The catalyst according to any one of Items 1 to 3, wherein, based on the weight of the catalyst as 100%, the content of the acidic molecular sieve component is 40-90 wt %, the content of the oxide additive is 5-40 wt %, the content of the first metal and/or first metal oxide is 0.01-20 wt %, and the content of the second metal and/or second metal oxide is 0.01-20 wt %.

5. The catalyst according to Item 4, wherein, based on the weight of the catalyst as 100%, the content of the acidic molecular sieve component is 50-80 wt %, the content of the oxide additive is $10^{-30}$ wt %, the content of the first metal and/or first metal oxide is 0.05-18 wt %, and the content of the second metal and/or second metal oxide is 0.05-18 wt %.

6. The catalyst according to any one of Items 1-5, wherein, the second metal is one or more selected from the group consisting of Group IA, Group IIA, Group IIIA, Group IVA, Group VA and lanthanide series metals, preferably one or more selected from the group consisting of Sr, Bi, Ce, Zr and Ge.

7. The catalyst according to any one of Items 1-6, wherein, the first metal is one or more selected from the group consisting of Mo, Re and W, preferably the first metal is at least two of Mo, Re and W, at a mixing ratio of 0.1-10:1 by weight; more preferably a combination of the three, at a mixing ratio of Mo, Re and W of 1:0.1-0.4:0.1-0.6 by weight.

8. The catalyst according to any one of Items 1-7, wherein, the acidic molecular sieve component is selected from acidic molecular sieve components having the characteristics of eight-, ten- or twelve-membered ring pore structure; preferably at least one selected from ZSM-5, SAPO-11, MCM-22, MOR, Beta, ZSM-12 and Y molecular sieves.

9. The catalyst according to any one of Items 1-8, wherein, the oxide additive is one or more selected from the group consisting of alumina, silica, magnesia, titania and kaolin.

10. A method for preparing a catalyst according to any one of Items 1-9, comprising:
1) impregnating an acidic molecular sieve component source with a solution of a first metal source, and carrying out a first heat treatment to obtain a first solid; impregnating an oxide additive source with a solution of a second metal source, and carrying out a second heat treatment to obtain a second solid; and
2) shaping the first solid and the second solid through kneading.

11. The method according to Item 10, wherein in step 1), each of the first and second heat treatment steps comprises: roasting or a combination of drying and roasting, wherein the drying conditions include: a temperature of 50-200° C., and a time of 1-30 h; wherein the calcination conditions include: heat treating for 1 to 30 hours at a temperature of 300-700° C. under an oxygen-containing atmosphere.

12. The method according to Item 11, wherein the oxygen-containing atmosphere is a mixed gas of air and steam at a volume ratio of 5-100:1.

13. The method according to any one of Items $10^{-12}$, wherein, the first metal source is a soluble compound containing Group VB, VIB and VIIB group metals; and/or the second metal source is a soluble compound containing the second metal; and/or the acidic molecular sieve source component is selected from acidic molecular sieve components having the characteristics of eight-, ten- or twelve-membered ring pore structure; preferably at least one selected from ZSM-5, SAPO-11, MCM-22, MOR, Beta, ZSM-12 and Y molecular sieves; and/or the oxide additive source is one or more selected from the group consisting of alumina, silica, magnesia, titania and kaolin.

14. A process for disproportionation and transalkylation, comprising: contacting a starting material of benzene, toluene and/or heavy aromatics of C9 or higher with the catalyst according to any one of Items 1-9 for reaction in the presence of hydrogen to generate a light aromatic component.

EXAMPLES

The present application will be further illustrated with reference to the following examples, but the present application is not limited thereto.

In the following examples and comparative examples, unless otherwise specified, reagents and starting materials used are commercially available products, which are chemically pure.

In the following examples and comparative examples, the ammonia desorption amount was measured by the $NH_3$-TPD method, which was performed as follows: weighing 50 mg of sample, purging under flowing helium (30 ml/min) at 500° C. for 30 minutes, reducing the temperature to 100° C. to adsorb $NH_3$ gas for 10 minutes until an adsorption equilibrium is obtained, switching to helium (30 ml/min)

In the following examples and comparative examples, TEM images of the catalysts obtained were obtained by Tecnai G2F 20S-TWIN high-resolution field emission transmission electron microscope from FEI Company, operating at a voltage of 200 kV. Elemental analysis was detected using an energy scattering X-ray analyzer equipped on the transmission electron microscope.

In the following examples and comparative examples, the conversion rate of the starting material and the selectivity of the product are calculated as follows:

$$\text{Total conversion rate} = \frac{(\text{toluene} + C_9^+A)\text{ entering the reactor} - (\text{toluene} + C_9^+A)\text{ exiting the reactor}}{(\text{toluene} + C_9^+A)\text{ entering the reactor}} \times 100\% \ (\text{wt.})$$

$$\text{Selectivity to } (B + C_8A) = \frac{(\text{benzene} + C_8A)\text{ exiting the reactor} - (\text{benzene} + C_8A)\text{ entering the reactor}}{(\text{toluene} + C_9^+A)\text{ entering the reactor} - (\text{toluene} + C_9^+A)\text{ exiting the reactor}} \times 100\% \ (\text{wt.})$$

$$\text{Selectivity to xylene} = \frac{\text{xylene exiting the reactor} - \text{xylene entering the reactor}}{(\text{toluene} + C_9^+A)\text{ entering the reactor} - (\text{toluene} + C_9^+A)\text{ exiting the reactor}} \times 100\% \ (\text{wt.})$$

$$\text{Loss rate of aromatic ring} = \frac{\text{amount of aromatic ring exiting the reactor} - \text{amount of aromatic ring entering the reactor}}{\text{amount of aromatic ring entering the reactor}}$$
$$\times 100\% \ (\text{wt.})$$

$$\text{Total selectivity to } (B + T + C_8A) = \frac{\begin{array}{c}(\text{benzene} + \text{toluene} + C_8 \text{ aromatics})\text{ exiting the reactor} - \\ (\text{benzene} + \text{toluene} + C_8 \text{ aromatics})\text{ entering the reactor}\end{array}}{C_9^+A \text{ entering the reactor} - + C_9^+A \text{ exiting the reactor}} \times 100\% \ (\text{wt.})$$

and purging for 1 hour, raising the temperature to 600° C. at a rate of 10° C./min, and detecting the signal of $NH_3$ in the effluent by TCD.

In the following examples and comparative examples, the medium strong acid content of the catalyst was calculated based on the peak area of the $NH_3$-TPD pattern in the temperature range of 200-400° C. The ratio of the medium strong acid content to the total acid content is the ratio of the peak area of the $NH_3$-TPD pattern in the temperature range of 200-400° C. to the total peak area of the $NH_3$-TPD pattern in the temperature range of 100-600° C.

In the following examples and comparative examples, the B acid content and L acid content of the catalyst obtained were measured by pyridine infrared spectroscopy as follows: shaping the sample by tabletting, vacuumizing to $10^{-4}$ Pa, heating to 400° C. for heat treatment for 2 h, cooling to 200° C., then conducting static adsorption of pyridine for 5 min and balancing for 5 min, vacuumizing for 40 min, heating to 300° C. within 10 min and balancing for 5 min, and then carrying out IR scanning, wherein the B acid content and the L acid content are respectively calculated based on the absorption peak areas of the sample in the vicinity of 1540 $cm^{-1}$ and 1450 $cm^{-1}$.

wherein:
1) where the feedstock of the reaction is $C_9^+$ aromatic hydrocarbon, the total selectivity is defined as the selectivity to $(B+T+C_8A)$;
2) where the feedstock of the reaction is (toluene+$C_9^+$ aromatics) mixture, the total selectivity is defined as the selectivity to $(B+C_8A)$.

Examples of Series I

Examples of Series I illustrate the preparation and application of the catalyst according to the present application comprising only a first metal component immobilized on an acidic molecular sieve.

Example I-1

20 g of mordenite was taken, subjected to supersaturated impregnation with an ammonium molybdate solution, and pre-roasted for 3 hours at 400° C. under an air atmosphere to obtain a modified molecular sieve. The modified molecular sieve and 7.7 g of alumina were shaped by kneading, and the resultant was roasted for 2 hours at 550° C. under an air atmosphere to obtain a catalyst with a molybdenum content of 3 wt %, and the composition and properties of the resulting catalyst are shown in Table I-1.

Figure 1B:
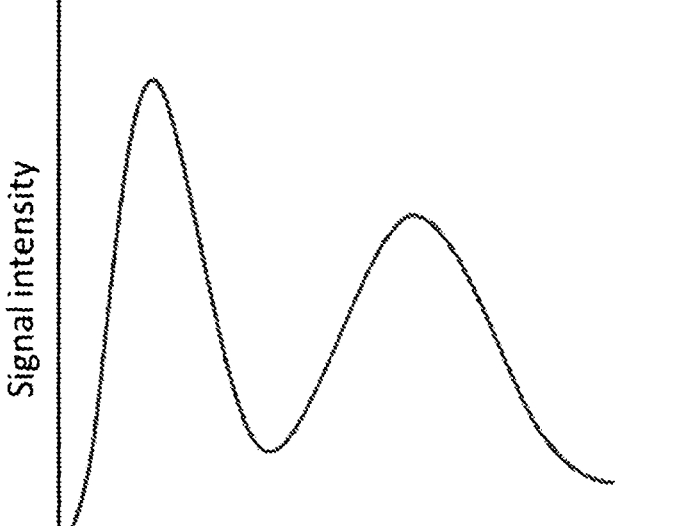

The NH$_3$-TPD pattern of the resulting catalyst is shown in FIG. 1A, in which the ratio of the peak area in the temperature range of 200-400° C. to the total peak area in the temperature range of 100-600° C. is significantly increased as compared with the NH$_3$-TPD pattern of the Comparative Example I-1 shown in FIG. 1B.

Figure 2:
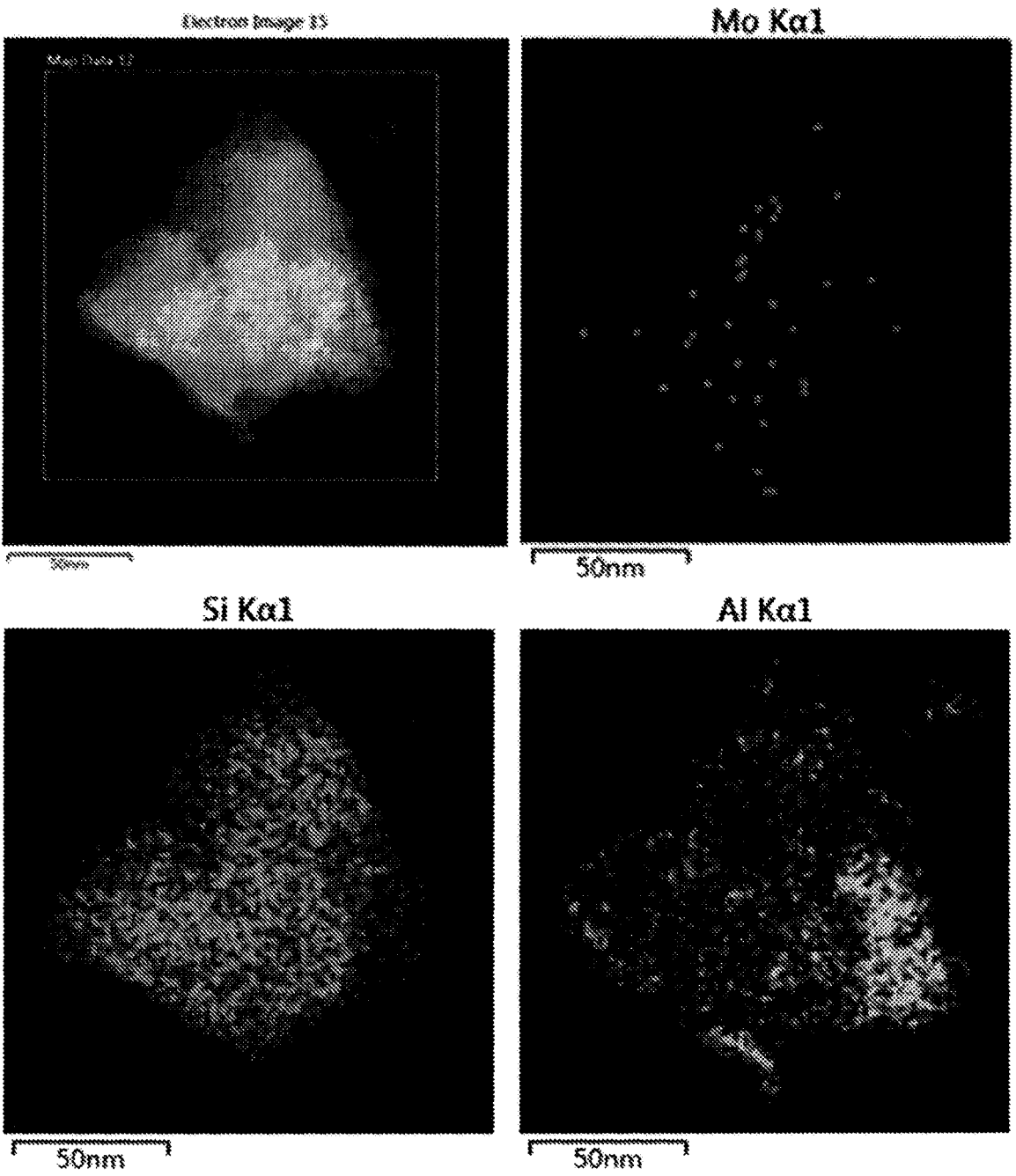
FIG. 2 shows a TEM image of the catalyst obtained in Example I-1 of the present application.

The TEM elemental analysis of the resulting catalyst is shown in FIG. 2, in which the upper left image shows the phase image of the molecular sieve and alumina in the catalyst, the upper right image shows the distribution of the supported Mo element, the lower left image shows the distribution of the Si element, and the lower right image shows the distribution of the Al element. From the composition of the resulting catalyst, it can be seen that the silicon-rich portion (see the lower left image) corresponds to the mordenite, while the aluminum-rich portion (see the lower right image) corresponds to the alumina additive, and from the distribution of the Mo element (see the upper right image), it can be seen that the Mo element is mainly distributed on the surface of the mordenite in the catalyst.

Example I-2

20 g of mordenite was taken, subjected to supersaturated impregnation with an ammonium perrhenate solution, and then pre-roasted at 400° C. for 3 hours under an air atmosphere to obtain a modified molecular sieve. The modified molecular sieve and 7.7 g of alumina were shaped by kneading, and the resultant was roasted for 2 hours at 550° C. under an air atmosphere to obtain a catalyst with a rhenium content of 0.5 wt %, and the composition and properties of the resulting catalyst are shown in Table I-1.

Example I-3

20 g of Beta molecular sieve was taken, subjected to supersaturated impregnation with an ammonium molybdate solution, and then pre-roasted for 3 hours at 400° C. under an air atmosphere to obtain a modified molecular sieve. The modified molecular sieve and 7.7 g of kaolin were shaped by kneading, and the resultant was roasted for 2 hours at 550° C. under an air atmosphere to obtain a catalyst with a molybdenum content of 1 wt %, and the composition and properties of the resulting catalyst are shown in Table I-1.

Example I-4

20 g of ZSM-12 molecular sieve was taken, subjected to supersaturated impregnation with an ammonium molybdate solution, and then pre-roasted for 3 hours at 400° C. under an air atmosphere to obtain a modified molecular sieve. The modified molecular sieve and 7.7 g of alumina were shaped by kneading, and the resultant was roasted for 2 hours at 550° C. under an air atmosphere to obtain a catalyst with a molybdenum content of 3 wt %, and the composition and properties of the resulting catalyst are shown in Table I-1.

Example I-5

20 g of MCM-22 molecular sieve was taken, subjected to supersaturated impregnation with an ammonium molybdate solution, and then pre-roasted for 3 hours at 400° C. under an air atmosphere. The modified molecular sieve and 7.7 g of alumina were shaped by kneading, and the resultant was roasted for 2 hours at 550° C. under an air atmosphere to obtain a catalyst with a molybdenum content of 4 wt %, and the composition and properties of the resulting catalyst are shown in Table I-1.

Example I-6

20 g of mordenite was taken, subjected to supersaturated impregnation with a solution containing ammonium dihydrogen phosphate and ammonium molybdate, and then pre-roasted for 3 hours at 400° C. under an air atmosphere. The modified molecular sieve and 7.7 g of alumina were shaped by kneading, and the resultant was roasted for 2 hours at 550° C. under an air atmosphere to obtain a catalyst with 0.5 wt % of phosphorus and 3 wt % of molybdenum, and the composition and properties of the resulting catalyst are shown in Table I-1.

Example I-7

20 g of USY molecular sieve was taken, subjected to supersaturated impregnation with an ammonium molybdate solution, and then pre-roasted for 3 hours at 400° C. under an air atmosphere to obtain a modified molecular sieve. The modified molecular sieve and 7.7 g of alumina were shaped by kneading, and the resultant was roasted for 2 hours at 550° C. under an air atmosphere to obtain a catalyst with a molybdenum content of 3 wt %, and the composition and properties of the resulting catalyst are shown in Table I-1.

Example I-8

20 g of SAPO-11 molecular sieve was taken, subjected to supersaturated impregnation with an ammonium molybdate solution, and then pre-roasted at 400° C. for 3 hours under an air atmosphere to obtain a modified molecular sieve. The modified molecular sieve and 7.7 g of alumina were shaped by kneading, and the resultant was roasted for 2 hours at 550° C. under an air atmosphere to obtain a catalyst with a molybdenum content of 3 wt %, and the composition and properties of the resulting catalyst are shown in Table I-1.

Example I-9

20 g of mordenite was taken, subjected to supersaturated impregnation with an ammonium molybdate solution, and pre-roasted for 3 hours at 400° C. under an air atmosphere to obtain a modified molecular sieve. The modified molecular sieve and 20 g of silica sol (containing 7.7 g of silica) were shaped by kneading, and the resultant was roasted for 2 hours at 550° C. under an air atmosphere to obtain a catalyst with a molybdenum content of 3 wt %, and the composition and properties of the resulting catalyst are shown in Table I-1.

Example I-10

20 g of mordenite was taken, subjected to supersaturated impregnation with an ammonium molybdate solution, and pre-roasted for 3 hours at 400° C. under an air atmosphere to obtain a modified molecular sieve. The modified molecular sieve and 6.7 g of alumina and 1 g of magnesia were shaped by kneading, and the resultant was roasted for 2 hours at 550° C. under an air atmosphere to obtain a catalyst with a molybdenum content of 3 wt %, and the composition and properties of the resulting catalyst are shown in Table I-1.

Example I-11

20 g of a mixture of ZSM-12 and ZSM-5 molecular sieves (at a weight ratio of 7:3) was taken, subjected to supersaturated impregnation with an ammonium molybdate solution, and then pre-roasted for 3 hours at 300° C. under an air atmosphere. The modified molecular sieve and 7.7 g of alumina were shaped by kneading, and the resultant was roasted for 2 hours at 550° C. under an air atmosphere to obtain a catalyst with a molybdenum content of 4 wt %, and the composition and properties of the resulting catalyst are shown in Table I-1.

Example I-12

A catalyst was prepared as described in Example I-1, except that a certain amount of mordenite was taken to impregnate with an ammonium molybdate and ammonium tungstate solution under otherwise identical conditions, the composition and properties of the resulting catalyst are shown in Table I-1.

Example I-13

A catalyst was prepared as described in Example I-1, except that a certain amount of mordenite was impregnated with a certain amount of ammonium molybdate, ammonium tungstate and ammonium perrhenate solution under otherwise identical conditions, the composition and properties of the resulting catalyst are shown in Table I-1.

Example I-14

A catalyst was prepared as described in Example 1, except that a certain amount of mordenite was impregnated with an ammonium molybdate solution to obtain a modified molecular sieve powder having a molybdenum content of 3 wt %, and the modified molecular sieve was pre-roasted at 400° C. for 3 hours under a mixed atmosphere of air and steam (at a volume ratio of air to steam of 20:1). Other conditions for preparing the catalysts were the same, and the composition and properties of the resulting catalyst are shown in Table I-1.

Example I-15

A catalyst was prepared as described in Example 1, except that a certain amount of mordenite was impregnated with an ammonium molybdate solution to obtain a modified molecular sieve powder having a molybdenum content of 3 wt %, and the modified molecular sieve was roasted at 400° C. for 3 hours under a mixed atmosphere of air and steam (at a volume ratio of air to steam of 5:1). Other conditions for preparing the catalysts were the same, and the composition and properties of the resulting catalyst are shown in Table I-1.

Example I-16

A catalyst was prepared as described in Example 1, except that a certain amount of mordenite was impregnated with an ammonium molybdate solution to obtain a modified molecular sieve powder with a molybdenum content of 3 wt %, and dried at 120° C. to obtain a modified molecular sieve. 20 g of the modified molecular sieve and 7.7 g of alumina were shaped by kneading, and the resultant was roasted at 550° C.

for 2 hours to obtain the catalyst. The composition and properties of the resulting catalyst are shown in Table I-1.

Example I-17

A catalyst was prepared as described in Example 1, except that a certain amount of mordenite was impregnated with a certain amount of ammonium molybdate, ammonium tungstate and ammonium perrhenate solution, the modified molecular sieve was pre-roasted at 400° C. for 3 hours under a mixed atmosphere of air and steam (at a volume ratio of air to steam of 20:1), and other conditions were the same. The composition and properties of the resulting catalyst are shown in Table I-1.

Example I-18

A catalyst was prepared as described in Example I-1, except that a certain amount of mordenite was impregnated with a certain amount of ammonium tungstate solution, and other conditions were the same. The composition and properties of the resulting catalyst are shown in Table I-1.

Example I-19

A catalyst was prepared as described in Example I-1, except that a certain amount of mordenite was impregnated with a certain amount of ammonium molybdate and ammonium perrhenate solution, and other conditions were the same. The composition and properties of the resulting catalyst are shown in Table I-1.

Example I-20

A catalyst was prepared as described in Example I-1, except that a certain amount of mordenite was impregnated with a certain amount of ammonium tungstate and ammonium perrhenate solution, and other conditions were the same. The composition and properties of the resulting catalyst are shown in Table I-1.

Example I-21

A catalyst was prepared as described in Example I-1, except that 20 g of mordenite was sprayed with an ammonium molybdate solution while stirring, and other conditions were the same. The composition and properties of the resulting catalyst are shown in Table I-1.

Comparative Example I-1

7.7 g of alumina and 20 g of mordenite were mixed and shaped, roasted at 550° C. for 2 hours to obtain a catalyst carrier, and then a certain amount of ammonium molybdate was loaded to obtain a catalyst with a molybdenum content of 3 wt %. The composition and properties of the resulting catalyst are shown in Table I-1. The $NH_3$-TPD of the resulting catalyst is shown in FIG. 1B, in which the strong acid peak area at a desorption temperatures above 400° C. is significantly larger than that in FIG. 1A.

TABLE I-1

| | | | | | | | | Ratio of |
|---|---|---|---|---|---|---|---|---|
| | Content of metal component, calculated as metal element, | Type of acidic molecular | Acidic molecular sieve content, | Type of oxide | Content of oxide additive, | Phosphorus content, calculate as P, | Mediate strong acid content, | mediate strong acid content to total acid |
| Example No. | wt % | sieve | wt % | additive | wt % | wt % | mmol/g · cat | content |
| Example I-1 | Mo, 3% | Mordenite | 70 | Alumina | 27 | — | 0.53 | 80 |
| Example I-2 | Re, 0.5% | Mordenite | 72 | Alumina | 27.5 | — | 0.49 | 69 |
| Example I-3 | Mo, 1% | Beta molecular sieve | 71.5 | Kaolin | 27.5 | — | 0.45 | 72 |
| Example I-4 | Mo, 3% | ZSM-12 molecular sieve | 70 | Alumina | 27 | — | 0.43 | 78 |
| Example I-5 | Mo, 4% | MCM-22 molecular sieve | 69 | Alumina | 27 | — | 0.38 | 80 |
| Example I-6 | Mo, 3% | Mordenite | 70 | Alumina | 26.5 | 0.5 wt % | 0.55 | 85 |
| Example I-7 | Mo, 3% | Y molecular sieve | 70 | Alumina | 27 | | 0.33 | 71 |
| Example I-8 | Mo, 3% | SAPO-11 | 70 | Alumina | 27 | | 0.19 | 85 |
| Example I-9 | Mo, 3% | Mordenite | 70 | Silica | 27 | | 0.45 | 81 |
| Example I-10 | Mo, 3% | Mordenite | 70 | Alumina + magnesia | 27 | | 0.51 | 82 |
| Example I-11 | Mo, 4% | ZSM-12 and ZSM-5 molecular sieves | 69 | Alumina | 27 | — | 0.48 | 78 |
| Example I-12 | Mo, 1.5 wt % W, 1.5 wt % | Mordenite | 70 | Alumina | 27 | — | 0.59 | 82 |
| Example I-13 | Mo, 2.0 wt % W, 0.4 wt % Re, 0.6 wt % | Mordenite | 70 | Alumina | 27 | — | 0.60 | 85 |
| Example I-14 | Mo, 3% | Mordenite | 70 | Alumina | 27 | — | 0.49 | 88 |
| Example I-15 | Mo, 3% | Mordenite | 70 | Alumina | 27 | — | 0.46 | 90 |
| Example I-16 | Mo, 3% | Mordenite | 70 | Alumina | 27 | — | 0.60 | 76 |
| Example I-17 | Mo, 2.0 wt % W, 0.4 wt % Re, 0.6 wt % | Mordenite | 70 | Alumina | 27 | — | 0.54 | 90 |
| Example I-18 | W, 3% | Mordenite | 70 | Alumina | 27 | | 0.58 | 70 |
| Example I-19 | Mo, 2.4 wt % Re, 0.6 wt % | Mordenite | 70 | Alumina | 27 | | 0.55 | 78 |
| Example I-20 | Re, 0.6 wt % W, 2.4 wt % | Mordenite | 70 | Alumina | 27 | | 0.61 | 74 |
| Example I-21 | Mo, 3% | Mordenite | 70 | Alumina | 27 | — | 0.54 | 80 |
| Comparative Example I-1 | Mo, 3% | Mordenite | 70 | Alumina | 27 | — | 0.47 | 65 |

Test Example I-1

5 g of the catalysts obtained in the above examples and comparative examples were respectively placed in a reactor, reduced at 450° C. in the presence of hydrogen for 3 hours, then cooled to a temperature of 370° C., and after that hydrogen and a stream containing toluene and $C_9^+$ aromatic hydrocarbons were introduced to contact with the catalysts for evaluating the reaction activity thereof.

The reaction conditions were as follows: a total weight space velocity of 4.0 h$^{-1}$, a reaction temperature of 370° C., a reaction pressure of 2.5 MPa, and a hydrogen-to-hydro-carbon molecular ratio of 3.0. The feedstock for the reaction had a ratio of toluene to $C_9^+A$ of 50:50 by weight, in which the $C_9^+A$ comprises 20% (by weight) of $C_{10}^+A$, the $C_9A$ comprised the following components by weight: 4.2% of propyl benzene, 31.0% of methyl ethyl benzene, 59.6% of trimethyl benzene, 5.2% of indane, and the $C_{10}^+A$ comprised the following components by weight: 3.6% of diethylben-zene, 26.9% of dimethyl ethylbenzene, 2.3% of methyl propyl benzene, 28.8% of tetramethylbenzene, 14.4% of methyl naphthalene, 11.1% of dimethyl naphthalene and 12.9% of the rest. The test conditions and results are shown in Table I-2.

TABLE I-2

| | | | | | | |
|---|---|---|---|---|---|---|
| | | | Conditions and results of Test Example I-1 | | | |
| | | Space | Total | Total | Xylene | Loss rate of |
| | H$_2$/HC | velocity of | conversion | selectivity, | selectivity, | aromatic |
| Example No. | mol/mol | feed, h$^{-1}$ | rate, wt % | wt % | wt % | ring, wt % |
| I-1 | 3 | 4 | 47.5 | 90.3 | 73.3 | 1.3 |
| I-2 | 3 | 4 | 47.3 | 89.4 | 73.1 | 1.5 |
| I-3 | 3 | 4 | 48.3 | 90.1 | 73.5 | 1.2 |

TABLE I-2-continued

| | | | | | |
|---|---|---|---|---|---|
| Conditions and results of Test Example I-1 | | | | | |
| Example No. | H₂/HC mol/mol | Space velocity of feed, h⁻¹ | Total conversion rate, wt % | Total selectivity, wt % | Xylene selectivity, wt % | Loss rate of aromatic ring, wt % |
| I-4 | 3 | 4 | 47.2 | 89.7 | 73.2 | 1.5 |
| I-5 | 3 | 4 | 45.1 | 89.0 | 73.0 | 1.6 |
| I-6 | 3 | 4 | 48.2 | 91.4 | 74.9 | 0.8 |
| I-7 | 3 | 4 | 46.9 | 89.1 | 73.5 | 1.5 |
| I-8 | 3 | 4 | 45.2 | 90.4 | 71.7 | 1.1 |
| I-9 | 3 | 4 | 46.7 | 90.4 | 73.1 | 1.2 |
| I-10 | 3 | 4 | 47.3 | 90.2 | 73.1 | 1.2 |
| I-11 | 3 | 4 | 48.1 | 91.0 | 74.8 | 0.9 |
| I-12 | 3 | 4 | 47.8 | 90.7 | 73.9 | 1.1 |
| I-13 | 3 | 4 | 47.9 | 90.5 | 73.7 | 1.1 |
| I-14 | 3 | 4 | 47.7 | 90.9 | 74.3 | 1.0 |
| I-15 | 3 | 4 | 47.8 | 91.1 | 74.6 | 0.9 |
| I-16 | 3 | 4 | 47.0 | 89.6 | 72.9 | 1.5 |
| I-17 | 3 | 4 | 48.5 | 91.3 | 74.4 | 0.7 |
| I-18 | 3 | 4 | 47.6 | 89.6 | 73.0 | 1.6 |
| I-19 | 3 | 4 | 47.8 | 90.8 | 73.6 | 1.0 |
| I-20 | 3 | 4 | 47.3 | 90.5 | 73.5 | 1.1 |
| I-21 | 3 | 4 | 47.2 | 90.1 | 73.0 | 1.4 |
| Comparative Example I-1 | 3 | 4 | 46.5 | 87.7 | 72.5 | 2.4 |

As can be seen from the results of Table 1-2, by selectively immobilizing the metal on the molecular sieve, the conversion rate can be improved while reducing the loss rate of aromatic ring, as compared with the comparative example. In a preferred embodiment, by incorporating a phosphorus compound, the conversion efficiency can be further improved to 48.2%, and the loss rate of aromatic ring can be further reduced to 0.8%. In a preferred embodiment, by incorporating compounds of the three metals Mo, Re and W, the conversion rate can be increased to 48.5%, and the loss rate of aromatic ring can be reduced to 0.7%.

Examples of Series II

Examples of Series II illustrate the preparation and application of catalysts according to the present application comprising a first metal component immobilized on an acidic molecular sieve and a second metal component immobilized on an oxide additive.

Example II-1

20 g of mordenite was taken, subjected to supersaturated impregnation with a certain amount of ammonium molybdate solution, spray dried at 150° C., and roasted at 400° C. for 3 hours under an air atmosphere to obtain a modified molecular sieve powder. 7.7 g of alumina was taken and subjected to isovolumetric impregnation with a certain amount of strontium nitrate, and dried at 150° C. to obtain a modified alumina. The modified molecular sieve and the modified alumina were shaped by kneading, and the resultant was roasted at 550° C. for 2 hours to obtain a catalyst with a molybdenum content of 1 wt % and a strontium content of 1.0 wt %, and the composition and properties of the resulting catalyst are shown in Table II-1.

Figure 3:
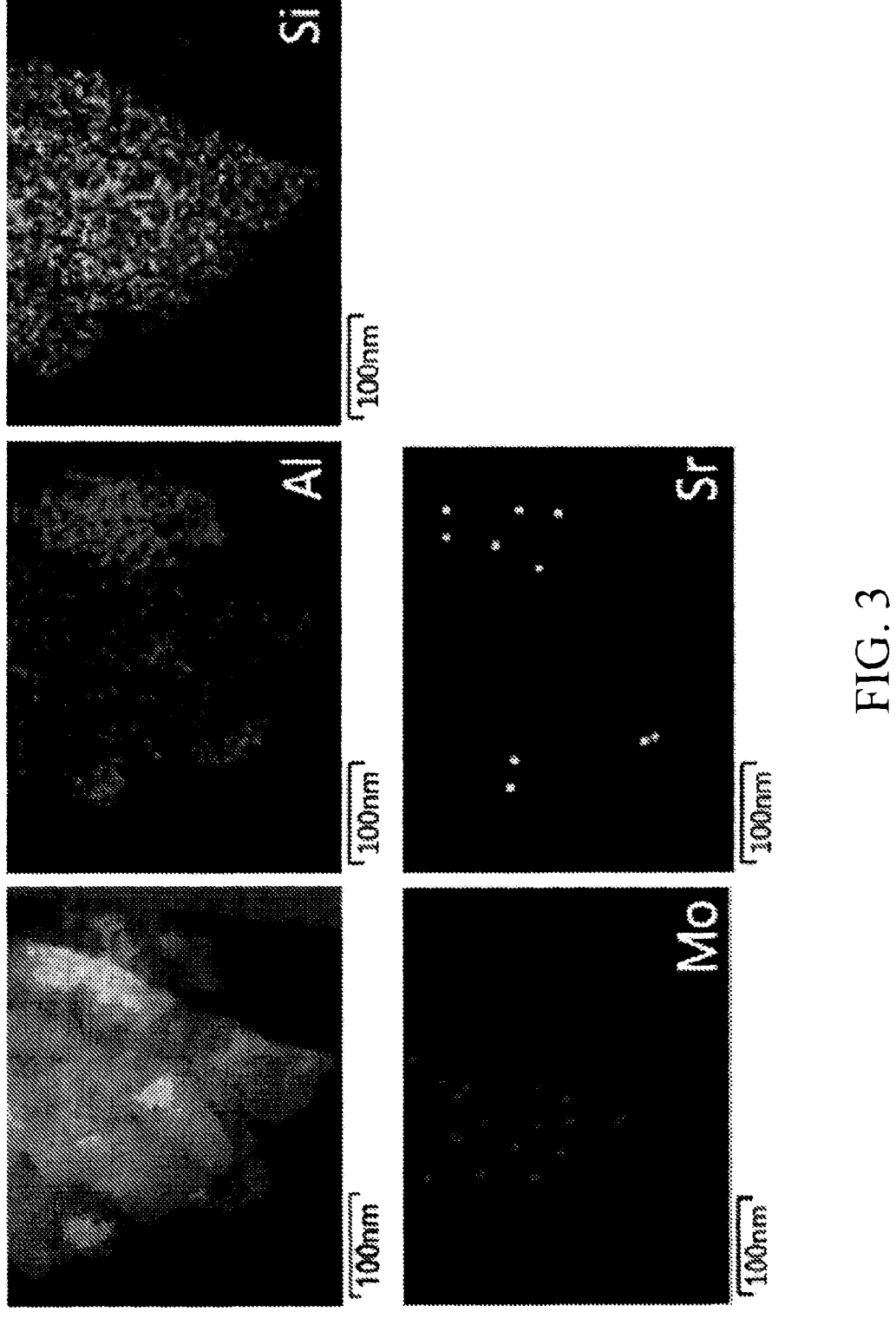
FIG. 3 shows a TEM image of the catalyst obtained in Example II-1 of the present application.

The TEM elemental analysis of the resulting catalyst is shown in FIG. 3, in which the upper left image shows a phase image of the combination of the molecular sieve and alumina in the catalyst, the upper right image shows an Al element distribution, the upper right image shows an Si element distribution, the lower left image shows an Mo element distribution, and the lower middle image shows an Sr element distribution. From the composition of the resulting catalyst, it can be seen that the silicon-rich portion (see upper right image) corresponds to mordenite, and the aluminum-rich portion (see upper middle image) corresponds to the alumina additive, and from the distribution of the metal oxides, it can be seen that Mo metal (see lower left image) is distributed mainly on the surface of the mordenite, and Sr element (see lower middle image) is distributed mainly on the surface of the alumina additive.

5 g of modified catalyst was placed in a reactor, reduced at 450° C. in the presence of hydrogen for 3 hours, then cooled to a temperature of 360° C., and after that hydrogen and a stream containing toluene and $C_9^+$ aromatic hydrocarbons were introduced to contact with the catalyst for evaluating the reaction activity thereof. The reaction conditions were as follows: a total weight space velocity of 4.0 h⁻¹, a reaction temperature of 360° C., a reaction pressure of 3.0 MPa, and a hydrogen-to-hydrocarbon molecular ratio of 3.0. The feedstock for the reaction had a ratio of toluene to $C_9^+A$ of 43:57 by weight, in which the $C_9^+A$ comprised 25% (by weight) of $C_{10}A$, the $C_9A$ comprised the following components by weight: 4.2% of propyl benzene, 32.0% of methyl ethyl benzene, 59.6% of trimethyl benzene and 4.2% of indane, and the $C_{10}A$ comprised the following components by weight: 15.3% of diethylbenzene, 36.9% of dimethyl ethylbenzene, 22.3% of methyl propyl benzene, 24.0% of tetramethylbenzene and 1.5% of methyl naphthalene. The test conditions and results are shown in Table II-2.

Example II-2

20 g of Beta zeolite was taken, subjected to supersaturated impregnation with a certain amount of ammonium molybdate solution, spray dried at 150° C., and roasted for 3 hours at 400° C. under an air atmosphere to obtain a modified molecular sieve powder. 7.7 g of alumina was taken and subjected to isovolumetric impregnation with a certain amount of strontium nitrate, and dried at 150° C. to obtain a modified alumina. The modified molecular sieve and the modified alumina were shaped by kneading, and the resultant was roasted at 550° C. for 2 hours to obtain a catalyst with a molybdenum content of 1 wt % and a strontium content of 1.0 wt %, and the composition and properties of the resulting catalyst are shown in Table II-1.

5 g of modified catalyst was placed in a reactor, reduced at 450° C. in the presence of hydrogen for 3 hours, then cooled to a temperature of 360° C., and after that hydrogen and a stream containing toluene and $C_9^+$ aromatic hydrocarbons were introduced to contact with the catalyst for evaluating the reaction activity thereof. The reaction conditions were as follows: a total weight space velocity of 4.0 $h^{-1}$, a reaction temperature of 360° C., a reaction pressure of 3.0 MPa, and a hydrogen-to-hydrocarbon molecular ratio of 3.0. The feedstock for the reaction had a ratio of toluene to $C_9^+A$ of 43:57 (by weight), in which the $C_9^+A$ comprised 25% (by weight) of $C_{10}A$, the $C_9A$ comprised the following components by weight: 4.2% of propyl benzene, 32.0% of methyl ethyl benzene, 59.6% of trimethyl benzene and 4.2% of indane, and the $C_{10}A$ comprised the following components by weight: 15.3% of diethylbenzene, 36.9% of dimethyl ethylbenzene, 22.3% of methyl propyl benzene, 24.0% of tetramethylbenzene and 1.5% of methyl naphthalene. The test conditions and results are shown in Table II-2.

Example II-3

20 g of ZSM-12 molecular sieve was taken, subjected to supersaturated impregnation with a certain amount of ammonium molybdate solution, spray dried at 150° C., and then roasted for 3 hours at 400° C. under an air atmosphere to obtain a modified molecular sieve powder. 7.7 g of alumina was taken and subjected to isovolumetric impregnation with a certain amount of strontium nitrate, and dried at 150° C. to obtain a modified alumina. The modified molecular sieve and the modified alumina were shaped by kneading, and the resultant was roasted at 550° C. for 2 hours to obtain a catalyst with a molybdenum content of 1 wt % and a strontium content of 1.0 wt %, and the composition and properties of the resulting catalyst are shown in Table II-1.

5 g of modified catalyst was placed in a reactor, reduced at 450° C. in the presence of hydrogen for 3 hours, then cooled to a temperature of 360° C., and after that hydrogen and a stream containing toluene and $C_9^+$ aromatic hydrocarbons were introduced to contact with the catalyst for evaluating the reaction activity thereof. The reaction conditions were as follows: a total weight space velocity of 4.0 $h^{-1}$, a reaction temperature of 360° C., a reaction pressure of 3.0 MPa, and a hydrogen-to-hydrocarbon molecular ratio of 3.0. The feedstock for the reaction had a ratio of toluene to $C_9^+A$ of 43:57 (by weight), in which the $C_9^+A$ comprised 25% (by weight) of $C_{10}A$, the $C_9A$ comprised the following components by weight: 4.2% of propyl benzene, 32.0% of methyl ethyl benzene, 59.6% of trimethyl benzene and 4.2% of indane, and the $C_{10}A$ comprised the following components by weight: 15.3% of diethylbenzene, 36.9% of dimethyl ethylbenzene, 22.3% of methyl propyl benzene, 24.0% of tetramethylbenzene and 1.5% of methyl naphthalene. The test conditions and results are shown in Table II-2.

Example II-4

20 g of ZSM-5 molecular sieve was taken, subjected to supersaturated impregnation with a certain amount of ammonium molybdate solution, spray dried at 150° C., and roasted for 3 hours at 400° C. under an air atmosphere to obtain a modified molecular sieve powder. 7.7 g of alumina was taken and subjected to isovolumetric impregnation with a certain amount of strontium nitrate, and dried at 150° C. to obtain a modified alumina. The modified molecular sieve and the modified alumina were shaped by kneading, and the resultant was roasted at 550° C. for 2 hours to obtain a catalyst with a molybdenum content of 1 wt % and a strontium content of 1.0 wt %, and the composition and properties of the resulting catalyst are shown in Table II-1.

5 g of modified catalyst was placed in a reactor, reduced at 450° C. in the presence of hydrogen for 3 hours, then cooled to a temperature of 360° C., and after that hydrogen and a stream containing toluene and $C_9^+$ aromatic hydrocarbons were introduced to contact with the catalyst for evaluating the reaction activity thereof. The reaction conditions were as follows: a total weight space velocity of 4.0 $h^{-1}$, a reaction temperature of 360° C., a reaction pressure of 3.0 MPa, and a hydrogen-to-hydrocarbon molecular ratio of 3.0. The feedstock for the reaction had a ratio of toluene to $C_9^+A$ of 43:57 (by weight), in which the $C_9^+A$ comprised 25% (by weight) of $C_{10}A$, the $C_9A$ comprised the following components by weight: 4.2% of propyl benzene, 32.0% of methyl ethyl benzene, 59.6% of trimethyl benzene and 4.2% of indane, and the $C_{10}A$ comprised the following components by weight: 15.3% of diethylbenzene, 36.9% of dimethyl ethylbenzene, 22.3% of methyl propyl benzene, 24.0% of tetramethylbenzene and 1.5% of methyl naphthalene. The test conditions and results are shown in Table II-2.

Example II-5

18 g of mordenite and 2 g of ZSM-5 molecular sieve were taken, uniformly mixed, subjected to supersaturated impregnation with a certain amount of ammonium molybdate solution, spray dried at 150° C., and roasted at 400° C. for 3 hours under an air atmosphere to obtain a modified molecular sieve powder. 19.2 g of silica sol (containing 40% of $SiO_2$) was taken and evenly mixed with a certain amount of strontium nitrate to obtain a modified silica sol. The modified molecular sieve and the modified silica sol were shaped by kneading, and the resultant was roasted at 550° C. for 2 hours to obtain a catalyst with a molybdenum content of 1 wt % and a strontium content of 1.0 wt %, and the composition and properties of the resulting catalyst are shown in Table II-1.

5 g of modified catalyst was placed in a reactor, reduced at 450° C. in the presence of hydrogen for 3 hours, then cooled to a temperature of 360° C., and after that hydrogen and a stream containing toluene and $C_9^+$ aromatic hydrocarbons were introduced to contact with the catalyst for evaluating the reaction activity thereof. The reaction conditions were as follows: a total weight space velocity of 4.0 $h^{-1}$, a reaction temperature of 360° C., a reaction pressure of 3.0 MPa, and a hydrogen-to-hydrocarbon molecular ratio of 3.0. The feedstock for the reaction had a ratio of toluene to $C_9^+A$ of 43:57 (by weight), in which the $C_9^+A$ comprised 25% (by weight) of $C_{10}A$, the $C_9A$ comprised the following components by weight: 4.2% of propyl benzene, 32.0% of methyl ethyl benzene, 59.6% of trimethyl benzene and 4.2% of indane, and the $C_{10}A$ comprised the following components by weight: 15.3% of diethylbenzene, 36.9% of dimethyl ethylbenzene, 22.3% of methyl propyl benzene, 24.0% of tetramethylbenzene and 1.5% of methyl naphthalene. The test conditions and results are shown in Table II-2.

Example II-6

18 g of mordenite and 2 g of ZSM-5 molecular sieve were taken, uniformly mixed, subjected to supersaturated impregnation with a certain amount of ammonium molybdate solution, spray dried at 150° C., and roasted at 400° C. for 3 hours under an air atmosphere to obtain a modified molecular sieve powder. 7.7 g of alumina was taken and subjected to isovolumetric impregnation with a certain amount of strontium nitrate, and dried at 150° C. to obtain a modified alumina. The modified molecular sieve and the modified alumina were shaped by kneading, and the resultant was roasted at 550° C. for 2 hours to obtain a catalyst with a molybdenum content of 1 wt % and a potassium content of 1.0 wt %, and the composition and properties of the resulting catalyst are shown in Table II-1.

5 g of modified catalyst was placed in a reactor, reduced at 450° C. in the presence of hydrogen for 3 hours, then cooled to a temperature of 360° C., and after that hydrogen and a stream containing toluene and $C_9^+$ aromatic hydrocarbons were introduced to contact with the catalyst for evaluating the reaction activity thereof. The reaction conditions were as follows: a total weight space velocity of 4.0 $h^{-1}$, a reaction temperature of 360° C., a reaction pressure of 3.0 MPa, and a hydrogen-to-hydrocarbon molecular ratio of 3.0. The feedstock for the reaction had a ratio of toluene to $C_9^+A$ of 43:57 (by weight), in which the $C_9^+A$ comprised 25% (by weight) of $C_{10}A$, the $C_9A$ comprised the following components by weight: 4.2% of propyl benzene, 32.0% of methyl ethyl benzene, 59.6% of trimethyl benzene and 4.2% of indane, and the $C_{10}A$ comprised the following components by weight: 15.3% of diethylbenzene, 36.9% of dimethyl ethylbenzene, 22.3% of methyl propyl benzene, 24.0% of tetramethylbenzene and 1.5% of methyl naphthalene. The test conditions and results are shown in Table II-2.

Example II-7

18 g of mordenite and 2 g of ZSM-5 molecular sieve were taken, uniformly mixed, subjected to supersaturated impregnation with a certain amount of ammonium molybdate solution, spray dried at 150° C., and roasted at 400° C. for 3 hours under an air atmosphere to obtain a modified molecular sieve powder. 7.7 g of alumina was taken and subjected to isovolumetric impregnation with a certain amount of gallium nitrate, and dried at 150° C. to obtain a modified alumina. The modified molecular sieve and the modified alumina were shaped by kneading, and the resultant was roasted at 550° C. for 2 hours to obtain a catalyst with a molybdenum content of 1 wt % and a gallium content of 1.0 wt %, and the composition and properties of the resulting catalyst are shown in Table II-1.

5 g of modified catalyst was placed in a reactor, reduced at 450° C. in the presence of hydrogen for 3 hours, then cooled to a temperature of 360° C., and after that hydrogen and a stream containing toluene and $C_9^+$ aromatic hydrocarbons were introduced to contact with the catalyst for evaluating the reaction activity thereof. The reaction conditions were as follows: a total weight space velocity of 4.0 $h^{-1}$, a reaction temperature of 360° C., a reaction pressure of 3.0 MPa, and a hydrogen-to-hydrocarbon molecular ratio of 3.0. The feedstock for the reaction had a ratio of toluene to $C_9^+A$ of 43:57 (by weight), in which the $C_9^+A$ comprised 25% (by weight) of $C_{10}A$, the $C_9A$ comprised the following components by weight: 4.2% of propyl benzene, 32.0% of methyl ethyl benzene, 59.6% of trimethyl benzene and 4.2% of indane, and the $C_{10}A$ comprised the following components by weight: 15.3% of diethylbenzene, 36.9% of dimethyl ethylbenzene, 22.3% of methyl propyl benzene, 24.0% of tetramethylbenzene and 1.5% of methyl naphthalene. The test conditions and results are shown in Table II-2.

Example II-8

18 g of mordenite and 2 g of ZSM-5 molecular sieve were taken, uniformly mixed, subjected to supersaturated impregnation with a certain amount of ammonium molybdate solution, spray dried at 150° C., and roasted at 400° C. for 3 hours under an air atmosphere to obtain a modified molecular sieve powder. 7.7 g of alumina was taken and subjected to isovolumetric impregnation with a certain amount of strontium nitrate, and dried at 150° C. to obtain a modified alumina. The modified molecular sieve and the modified alumina were shaped by kneading, and the resultant was roasted at 550° C. for 2 hours to obtain a catalyst with a molybdenum content of 1 wt % and a strontium content of 1.0 wt %, and the composition and properties of the resulting catalyst are shown in Table II-1.

5 g of modified catalyst was placed in a reactor, reduced at 450° C. in the presence of hydrogen for 3 hours, then cooled to a temperature of 360° C., and after that hydrogen and a stream containing toluene and $C_9^+$ aromatic hydrocarbons were introduced to contact with the catalyst for evaluating the reaction activity thereof. The reaction conditions were as follows: a total weight space velocity of 4.0 $h^{-1}$, a reaction temperature of 360° C., a reaction pressure of 3.0 MPa, and a hydrogen-to-hydrocarbon molecular ratio of 3.0. The feedstock for the reaction had a ratio of toluene to $C_9^+A$ of 43:57 (by weight), in which the $C_9^+A$ comprised 25% (by weight) of $C_{10}A$, the $C_9A$ comprised the following components by weight: 4.2% of propyl benzene, 32.0% of methyl ethyl benzene, 59.6% of trimethyl benzene and 4.2% of indane, and the $C_{10}A$ comprised the following components by weight: 15.3% of diethylbenzene, 36.9% of dimethyl ethylbenzene, 22.3% of methyl propyl benzene, 24.0% of tetramethylbenzene and 1.5% of methyl naphthalene. The test conditions and results are shown in Table II-2.

Example II-9

15 g of mordenite and 5 g of ZSM-5 molecular sieve were taken, mixed, subjected to supersaturated impregnation with a certain amount of ammonium molybdate solution, dried at 120° C. for 10 hours, and roasted at 450° C. for 3 hours under an air atmosphere to obtain a modified molecular sieve powder. 7.7 g of alumina was taken and subjected to isovolumetric impregnation with a certain amount of bismuth nitrate, and dried at 120° C. to obtain a modified alumina. The modified molecular sieve and the modified alumina were shaped by kneading, and the resultant was roasted for 6 hours at 500° C. to obtain a catalyst with a molybdenum content of 3 wt % and a bismuth content of 5 wt %, and the composition and properties of the resulting catalyst are shown in Table II-1.

5 g of modified catalyst was placed in a reactor, reduced at 450° C. in the presence of hydrogen for 3 hours, then cooled to a temperature of 360° C., and after that hydrogen and a stream containing toluene and C9$^+$ aromatic hydrocarbons were introduced to contact with the catalyst for evaluating the reaction activity thereof. The reaction conditions were as follows: a total weight space velocity of 4.0 $h^{-1}$, a reaction temperature of 360° C., a reaction pressure of 2.5 MPa, and a hydrogen-to-hydrocarbon molecular ratio of 2.0. The feedstock for the reaction had a ratio of toluene to $C_9^+A$ of 43:57 (by weight), in which the $C_9^+A$ comprised 25% (by weight) of $C_{10}A$, the $C_9A$ comprised the following components by weight: 4.2% of propyl benzene, 32.0% of methyl ethyl benzene, 59.6% of trimethyl benzene and 4.2% of indane, and the $C_{10}A$ comprised the following components by weight: 15.3% of diethylbenzene, 36.9% of dimethyl ethyl ethylbenzene, 22.3% of methyl propyl benzene, 24.0% of tetramethylbenzene and 1.5% of methyl naphthalene. The test conditions and results are shown in Table II-2.

Example II-10

15 g of mordenite and 5 g of ZSM-5 molecular sieve were taken, uniformly mixed, and subjected to isovolumetric impregnation with a certain amount of ammonium molybdate solution, dried at 120° C. for 10 hours, and roasted at 500° C. for 3 hours under an air atmosphere to obtain a modified molecular sieve powder. 7.7 g of alumina was taken and subjected to isovolumetric impregnation with a certain amount of cerous nitrate, dried at 120° C. for 10 hours and then roasted at 400° C. for 3 hours under an air atmosphere to obtain a modified alumina. The modified molecular sieve and the modified alumina were shaped by kneading, and the resultant was roasted at 550° C. for 2 hours to obtain a catalyst with a molybdenum content of 13 wt % and a cerium content of 8.0 wt %, and the composition and properties of the resulting catalyst are shown in Table II-1.

5 g of modified catalyst was placed in a reactor, reduced at 450° C. in the presence of hydrogen for 3 hours, then cooled to a temperature of 370° C., and after that hydrogen and a stream containing toluene and $C_9^+$ aromatic hydrocarbons were introduced to contact with the catalyst for evaluating the reaction activity thereof. The reaction conditions were as follows: a total weight space velocity of 4.0 h⁻¹, a reaction temperature of 370° C., a reaction pressure of 3.5 MPa, and a hydrogen-to-hydrocarbon molecular ratio of 3.0. The feedstock for the reaction was 100% reformate $C_9^+A$, in which the $C_9A$ comprised the following components by weight: 4.2% of propyl benzene, 32.0% of methyl ethyl benzene, 59.6% of trimethyl benzene and 4.2% of indane, and the $C_{10}A$ comprised the following components by weight: 15.3% of diethylbenzene, 36.9% of dimethyl ethylbenzene, 22.3% of methyl propyl benzene, 24.0% of tetramethylbenzene and 1.5% of methyl naphthalene. The test conditions and results are shown in Table II-2.

Example II-11

15 g of mordenite and 5 g of ZSM-5 molecular sieve were taken, mixed, subjected to supersaturated impregnation with a certain amount of ammonium molybdate solution, subjected to fast spray drying at 160° C., and roasted at 500° C. for 3 hours to obtain a modified molecular sieve powder. 7.7 g of alumina was taken and subjected to isovolumetric impregnation with a certain amount of bismuth nitrate, dried at 160° C. to obtain a modified alumina, and then roasted for 3 hours at 500° C. The modified molecular sieve and the modified alumina were shaped by kneading, and the resultant was roasted for 6 hours at 500° C. to obtain a catalyst with a molybdenum content of 3 wt % and a bismuth content of 5 wt %, and the composition and properties of the resulting catalyst are shown in Table II-1.

5 g of modified catalyst was placed in a reactor, reduced at 450° C. in the presence of hydrogen for 3 hours, then cooled to a temperature of 360° C., and after that hydrogen and a stream containing toluene and $C_9^+$ aromatic hydrocarbons were introduced to contact with the catalyst for evaluating the reaction activity thereof. The reaction conditions were as follows: a total weight space velocity of 4.0 h⁻¹, a reaction temperature of 360° C., a reaction pressure of 2.5 MPa, and a hydrogen-to-hydrocarbon molecular ratio of 4.0. The feedstock for the reaction had a ratio of toluene to $C_9^+A$ of 43:57 (by weight), in which the $C_9^+A$ comprised 25% (by weight) of $C_{10}A$, the $C_9A$ comprised the following components by weight: 4.2% of propyl benzene, 32.0% of methyl ethyl benzene, 59.6% of trimethyl benzene and 4.2% of indane, and the $C_{10}A$ comprised the following components by weight: 15.3% of diethylbenzene, 36.9% of dimethyl ethyl ethylbenzene, 22.3% of methyl propyl benzene, 24.0% of tetramethylbenzene and 1.5% of methyl naphthalene. The test conditions and results are shown in Table II-2.

Example II-12

15 g of mordenite and 5 g of ZSM-5 molecular sieve were taken, mixed, subjected to supersaturated impregnation with a certain amount of ammonium molybdate solution, and roasted at 500° C. for 3 hours to obtain a modified molecular sieve powder. 7.7 g of alumina was taken and subjected to isovolumetric impregnation with a certain amount of bismuth nitrate, and roasted for 3 hours at 500° C. to obtain a modified alumina. The modified molecular sieve and the modified alumina were shaped by kneading, and the resultant was roasted at 550° C. for 3 hours to obtain a catalyst with a molybdenum content of 3 wt % and a bismuth content of 5 wt %, and the composition and properties of the resulting catalyst are shown in Table II-1.

5 g of modified catalyst was placed in a reactor, reduced at 450° C. in the presence of hydrogen for 3 hours, then cooled to a temperature of 360° C., and after that hydrogen and a stream containing toluene and $C_9^+$ aromatic hydrocarbons were introduced to contact with the catalyst for evaluating the reaction activity thereof. The reaction conditions were as follows: a total weight space velocity of 4.0 h⁻¹, a reaction temperature of 360° C., a reaction pressure of 2.5 MPa, and a hydrogen-to-hydrocarbon molecular ratio of 4.0. The feedstock for the reaction had a ratio of toluene to $C_9^+A$ of 43:57 (by weight), in which the $C_9^+A$ comprised 25% (by weight) of $C_{10}A$, the $C_9A$ comprised the following components by weight: 4.2% of propyl benzene, 32.0% of methyl ethyl benzene, 59.6% of trimethyl benzene and 4.2% of indane, and the $C_{10}A$ comprised the following components by weight: 15.3% of diethylbenzene, 36.9% of dimethyl ethyl ethylbenzene, 22.3% of methyl propyl benzene, 24.0% of tetramethylbenzene and 1.5% of methyl naphthalene. The test conditions and results are shown in Table II-2.

Example II-13

15 g of Beta molecular sieve and 5 g of ZSM-5 molecular sieve were taken, uniformly mixed, subjected to supersaturated impregnation with a certain amount of ammonium perrhenate solution, dried for 10 hours at 120° C., and roasted for 3 hours at 500° C. under an air atmosphere to obtain a modified molecular sieve powder. 7.7 g of alumina was taken and subjected to isovolumetric impregnation with a certain amount of germanium chloride, and dried for 10 hours at 120° C. to obtain a modified alumina. The modified molecular sieve and the modified alumina were shaped by kneading, and the resultant was roasted at 550° C. for 2 hours to obtain a catalyst with a rhenium content of 1 wt % and a germanium content of 3.0 wt %, and the composition and properties of the resulting catalyst are shown in Table II-1.

5 g of modified catalyst was placed in a reactor, reduced at 450° C. in the presence of hydrogen for 3 hours, then cooled to a temperature of 360° C., and after that hydrogen and a stream containing toluene and $C_9^+$ aromatic hydrocarbons were introduced to contact with the catalyst for evaluating the reaction activity thereof. The reaction conditions were as follows: a total weight space velocity of 4.0 h$^{-1}$, a reaction temperature of 360° C., a reaction pressure of 3.0 MPa, and a hydrogen-to-hydrocarbon molecular ratio of 3.0. The feedstock for the reaction had a ratio of toluene to $C_9^+A$ of 80:20 (by weight), in which the $C_9^+A$ comprised 25% (by weight) of $C_{10}A$, the $C_9A$ comprised the following components by weight: 4.2% of propyl benzene, 32.0% of methyl ethyl benzene, 59.6% of trimethyl benzene and 4.2% of indane, and the $C_{10}A$ comprised the following components by weight: 15.3% of diethylbenzene, 36.9% of dimethyl ethyl ethylbenzene, 22.3% of methyl propyl benzene, 24.0% of tetramethylbenzene and 1.5% of methyl naphthalene. The test conditions and results are shown in Table II-2.

Example II-14

15 g of ZSM-12 molecular sieve and 5 g of ZSM-5 molecular sieve were taken, uniformly mixed, subjected to isovolumetric impregnation with a certain amount of ammonium molybdate solution, dried at 120° C. for 10 hours, and roasted at 400° C. for 3 hours under an air atmosphere to obtain a modified molecular sieve powder. 4 g of alumina and 3.5 g of magnesia were uniformly mixed, and subjected to isovolumetric impregnation with a certain amount of zirconium chloride, and dried for 10 hours at 120° C. to obtain a modified oxide. The modified molecular sieve and the modified oxide were shaped by kneading, and the resultant was roasted for 4 hours at 500° C. to obtain a catalyst with a molybdenum content of 8 wt % and a zirconium content of 5.0 wt %, and the composition and properties of the resulting catalyst are shown in Table II-1.

5 g of modified catalyst was placed in a reactor, reduced at 450° C. in the presence of hydrogen for 3 hours, then cooled to a temperature of 360° C., and after that hydrogen and a stream containing toluene and $C_9^+$ aromatic hydrocarbons were introduced to contact with the catalyst for evaluating the reaction activity thereof. The reaction conditions were as follows: a total weight space velocity of 4.0 h$^{-1}$, a reaction temperature of 360° C., a reaction pressure of 3.5 MPa, and a hydrogen-to-hydrocarbon molecular ratio of 3.0. The feedstock for the reaction was 100% reformate $C_9^+A$, in which the $C_9^+A$ comprised 25% (by weight) of $C_{10}A$, the $C_9A$ comprised the following components by weight: 4.2% of propyl benzene, 32.0% of methyl ethyl benzene, 59.6% of trimethyl benzene and 4.2% of indane, and the $C_{10}A$ comprised the following components by weight: 15.3% of diethylbenzene, 36.9% of dimethyl ethylbenzene, 22.3% of methyl propyl benzene, 24.0% of tetramethylbenzene and 1.5% of methyl naphthalene. The test conditions and results are shown in Table II-2.

Example II-15

A catalyst was prepared as described in Example II-1, except that 18 g of mordenite and 2 g of ZSM-5 were taken, uniformly mixed, and then subjected to supersaturated impregnation with a certain amount of an ammonium molybdate and ammonium tungstate solution, and other conditions were the same. The composition and properties of the resulting catalyst are shown in Table II-1, and the test conditions and results are shown in Table II-2.

Example II-16

A catalyst was prepared as described in Example II-1, except that 18 grams of mordenite and 2 grams of ZSM-5 molecular sieve were taken, uniformly mixed, and then subjected to supersaturated impregnation with a certain amount of an ammonium molybdate and ammonium perrhenate solution, and other conditions were the same. The composition and properties of the resulting catalyst are shown in Table II-1 and the test conditions and results are shown in Table II-2.

Example II-17

A catalyst was prepared as described in Example II-1, except that 18 g of mordenite and 2 g of ZSM-5 molecular sieve were taken, uniformly mixed, and then subjected to supersaturated impregnation with a certain amount of an ammonium tungstate and ammonium perrhenate solution, and other conditions were the same. The composition and properties of the resulting catalyst are shown in Table II-1, and the test conditions and results are shown in Table II-2.

Example II-18

A catalyst was prepared as described in Example II-1, except that 18 grams of mordenite and 2 grams of ZSM-5 molecular sieve were taken, uniformly mixed, and then subjected to supersaturated impregnation with a certain amount of an ammonium molybdate, ammonium tungstate and ammonium perrhenate solution, and other conditions were the same. The composition and properties of the resulting catalyst are shown in Table II-1 and the test conditions and results are shown in Table II-2.

Example II-19

A catalyst was prepared as described in Example II-1, except that 18 g of mordenite and 2 g of ZSM-5 molecular sieve were taken, uniformly mixed, and then subjected to supersaturated impregnation with a certain amount of ammonium molybdate solution, dried at 120° C. for 10 hours, and roasted at 400° C. for 3 hours under a mixed atmosphere of air and steam (at a volume ratio of air to steam of 20:1) to obtain a modified molecular sieve powder, and other conditions for the preparation and reduction of the catalyst and the reaction conditions were the same. The composition and properties of the resulting catalyst are shown in Table II-1, and the test conditions and results are shown in Table II-2.

Example II-20

A catalyst was prepared as described in Example II-1, except that 18 g of mordenite and 2 g of ZSM-5 molecular sieve were taken, uniformly mixed, sprayed with a certain amount of ammonium molybdate solution, dried at 120° C. for 10 hours, and roasted at 400° C. for 3 hours under a mixed atmosphere of air and steam (at a volume ratio of air to steam of 5:1) to obtain a modified molecular sieve powder, and other conditions for the preparation and reduction of the catalyst and the reaction conditions were the same. The composition and properties of the resulting catalyst are shown in Table II-1, and the test conditions and results are shown in Table II-2.

Example II-21

A catalyst was prepared as described in Example II-1, except that 18 g of mordenite and 2 g of ZSM-5 zeolite were taken, uniformly mixed, and then subjected to isovolumetric impregnation with a certain amount of ammonium molybdate solution, dried at 120° C. to obtain a modified molecular sieve powder, 7.7 g of alumina was subjected to isovolumetric impregnation with a certain amount of strontium nitrate, and dried at 150° C. to obtain a modified alumina. The modified molecular sieve and the modified alumina were shaped by kneading, roasted at 550° C. for 2 hours to obtain the catalyst, and other conditions for the preparation and reduction of the catalyst and the reaction conditions were the same. The composition and properties of the resulting catalyst are shown in Table II-1, and the test conditions and results are shown in Table II-2.

Example II-22

A catalyst was prepared as described in Example II-9, except that the modified molecular sieve was dried at 120° C. for 10 hours and then roasted at 400° C. for 3 hours under a mixed atmosphere of air and steam (at a volume ratio of air to steam of 5:1), and other conditions for the preparation and reduction of the catalyst and the reaction conditions were the same. The composition and properties of the resulting catalyst are shown in Table II-1, and the test conditions and results are shown in Table II-2.

Comparative Example II-1

15 g of mordenite, 5 g of ZSM-5 and 7.7 g of alumina were mixed and shaped, roasted for 2 hours at 550° C. to obtain a carrier, then subjected to isovolumetric impregnation with a certain amount of ammonium molybdate solution, roasted for 3 hours at 500° C. to obtain a modified catalyst with a molybdenum content of 1 wt %, and the composition and properties of the resulting catalyst are shown in Table II-1.

5 g of modified catalyst was placed in a reactor, reduced at 450° C. in the presence of hydrogen for 3 hours, then cooled to a temperature of 360° C., and after that hydrogen and a stream containing toluene and $C_9^+$ aromatic hydrocarbons were introduced to contact with the catalyst for evaluating the reaction activity thereof. The reaction conditions were as follows: a total weight space velocity of 4.0 $h^{-1}$, a reaction temperature of 360° C., a reaction pressure of 2.5 MPa, and a hydrogen-to-hydrocarbon molecular ratio of 3.0. The feedstock for the reaction had a ratio of toluene to $C_9^+A$ of 43:57 (by weight), in which the $C_9^+A$ comprised 25% (by weight) of $C_{10}A$, the $C_9A$ comprised the following components by weight: 4.2% of propyl benzene, 32.0% of methyl ethyl benzene, 59.6% of trimethyl benzene and 4.2% of indane, and the $C_{10}A$ comprised the following components by weight: 15.3% of diethylbenzene, 36.9% of dimethyl ethylbenzene, 22.3% of methyl propyl benzene, 24.0% of tetramethylbenzene and 1.5% of methyl naphthalene. The test conditions and results are shown in Table II-2.

Comparative Example II-2

15 g of mordenite, 5 g of ZSM-5 and 7.7 g of alumina were mixed and shaped, roasted for 2 hours at 550° C. to obtain a carrier, then subjected to isovolumetric impregnation with a certain amount of an ammonium molybdate and strontium chloride solution, roasted for 4 hours at 500° C. to obtain a modified catalyst with a molybdenum content of 1 wt % and a strontium content of 1 wt %, and the composition and properties of the resulting catalyst are shown in Table II-1.

5 g of modified catalyst was placed in a reactor, reduced at 450° C. in the presence of hydrogen for 3 hours, then cooled to a temperature of 360° C., and after that hydrogen and a stream containing toluene and $C_9^+$ aromatic hydrocarbons were introduced to contact with the catalyst for evaluating the reaction activity thereof. The reaction conditions were as follows: a total weight space velocity of 4.0 $h^{-1}$, a reaction temperature of 360° C., a reaction pressure of 2.5 MPa, and a hydrogen-to-hydrocarbon molecular ratio of 3.0. The feedstock for the reaction had a ratio of toluene to $C_9^+A$ of 43:57 (by weight), in which the $C_9^+A$ comprised 25% (by weight) of $C_{10}A$, the $C_9A$ comprised the following components by weight: 4.2% of propyl benzene, 32.0% of methyl ethyl benzene, 59.6% of trimethyl benzene and 4.2% of indane, and the $C_{10}A$ comprised the following components by weight: 15.3% of diethylbenzene, 36.9% of dimethyl ethylbenzene, 22.3% of methyl propyl benzene, 24.0% of tetramethylbenzene and 1.5% of methyl naphthalene. The test conditions and results are shown in Table II-2.

Comparative Example II-3

15 g of mordenite, 5 g of ZSM-5 and 7.7 g of alumina were mixed, and a certain amount of nitric acid aqueous solution containing ammonium molybdate and nickel nitrate was added thereto, and shaped by kneading. The resultant was roasted at 550° C. for 4 hours to obtain a modified catalyst having a molybdenum content of 10 wt % and a nickel content of 3 wt %, and the composition and properties of the resulting catalyst are shown in Table II-1.

5 g of modified catalyst was placed in a reactor, reduced at 450° C. in the presence of hydrogen for 3 hours, then cooled to a temperature of 360° C., and after that hydrogen and a stream containing toluene and $C_9^+$ aromatic hydrocarbons were introduced to contact with the catalyst for evaluating the reaction activity thereof. The reaction conditions were as follows: a total weight space velocity of 4.0 $h^{-1}$, a reaction temperature of 360° C., a reaction pressure of 3.5 MPa, and a hydrogen-to-hydrocarbon molecular ratio of 3.0. The feedstock for the reaction was 100% reformate $C_9^+A$, in which the $C_9^+A$ comprised 25% (by weight) of $C_{10}A$, the $C_9A$ comprised the following components by weight: 4.2% of propyl benzene, 32.0% of methyl ethyl benzene, 59.6% of trimethyl benzene and 4.2% of indane, and the $C_{10}A$ comprised the following components by weight: 15.3% of diethylbenzene, 36.9% of dimethyl ethylbenzene, 22.3% of methyl propyl benzene, 24.0% of tetramethylbenzene and 1.5% of methyl naphthalene. The test conditions and results are shown in Table II-2.

Comparative Example II-4

18 g of mordenite and 2 g of ZSM-5 molecular sieve were taken, uniformly mixed, subjected to ion exchange with a certain amount of ammonium chloroplatinate solution, spray dried at 150° C., and roasted for 3 hours at 400° C. under an air atmosphere to obtain a modified molecular sieve powder. 7.7 g of alumina was taken and subjected to isovolumetric impregnation with a certain amount of strontium nitrate, and spray dried at 150° C. to obtain a modified alumina. The modified molecular sieve and the modified alumina were shaped by kneading, and the resultant was roasted at 550° C. for 2 hours to obtain a catalyst with a platinum content of 0.05 wt % and a strontium content of 2.0 wt %, and the composition and properties of the resulting catalyst are shown in Table II-1.

5 g of modified catalyst was placed in a reactor, reduced at 450° C. in the presence of hydrogen for 3 hours, then cooled to a temperature of 360° C., and after that hydrogen and a stream containing toluene and $C_9^+$ aromatic hydrocarbons were introduced to contact with the catalyst for evaluating the reaction activity thereof. The reaction conditions were as follows: a total weight space velocity of 4.0 $h^{-1}$, a reaction temperature of 360° C., a reaction pressure of 2.5 MPa, and a hydrogen-to-hydrocarbon molecular ratio of 4.0. The feedstock for the reaction had a ratio of toluene to $C_9^+A$ of 43:57 (by weight), in which the $C_9^+A$ comprised 25% (by weight) of $C_{10}A$, the $C_9A$ comprised the following components by weight: 4.2% of propyl benzene, 32.0% of methyl ethyl benzene, 59.6% of trimethyl benzene and 4.2% of indane, and the $C_{10}A$ comprised the following components by weight: 15.3% of diethylbenzene, 36.9% of dimethyl ethylbenzene, 22.3% of methyl propyl benzene, 24.0% of tetramethylbenzene and 1.5% of methyl naphthalene. The test conditions and results are shown in Table II-2.

Comparative Example II-5

18 g of mordenite and 2 g of ZSM-5 molecular sieve were taken, uniformly mixed, subjected to ion exchange with a certain amount of nitrosoplatinum ammonium solution, spray dried at 150° C., and roasted at 400° C. for 3 hours under an air atmosphere to obtain a modified molecular sieve powder. 7.0 g of alumina and 0.7 g of titania were uniformly mixed, impregnated with a certain amount of strontium nitrate, and spray dried at 150° C. to obtain a modified alumina. The modified molecular sieve and the modified alumina were shaped by kneading, and the resultant was roasted at 550° C. for 2 hours to obtain a catalyst with a platinum content of 0.1 wt % and a strontium content of 2.0 wt %, and the composition and properties of the resulting catalyst are shown in Table II-1.

5 g of modified catalyst was placed in a reactor, reduced at 450° C. in the presence of hydrogen for 3 hours, then cooled to a temperature of 360° C., and after that hydrogen and a stream containing toluene and $C_9^+$ aromatic hydrocarbons were introduced to contact with the catalyst for evaluating the reaction activity thereof. The reaction conditions were as follows: a total weight space velocity of 4.0 $h^{-1}$, a reaction temperature of 360° C., a reaction pressure of 2.5 MPa, and a hydrogen-to-hydrocarbon molecular ratio of 4.0. The feedstock for the reaction had a ratio of toluene to $C_9^+A$ of 43:57 (by weight), in which the $C_9^+A$ comprised 25% (by weight) of $C_{10}A$, the $C_9A$ comprised the following components by weight: 4.2% of propyl benzene, 32.0% of methyl ethyl benzene, 59.6% of trimethyl benzene and 4.2% of indane, and the $C_{10}A$ comprised the following components by weight: 15.3% of diethylbenzene, 36.9% of dimethyl ethylbenzene, 22.3% of methyl propyl benzene, 24.0% of tetramethylbenzene and 1.5% of methyl naphthalene. The test conditions and results are shown in Table II-2.

Comparative Example II-6

20 g of mordenite was taken, subjected to supersaturated impregnation with a certain amount of dinitroplatinum ammonium solution, and spray dried at 200° C. to obtain a modified molecular sieve powder. 7.7 g of kaolin was taken and impregnated with a certain amount of zinc nitrate and dried at 150° C. to obtain a modified alumina. The modified molecular sieve and the modified alumina were shaped by kneading, and the resultant was roasted at 550° C. for 2 hours to obtain a catalyst with a platinum content of 0.05 wt % and a zinc content of 2.0 wt %, and the composition and properties of the resulting catalyst are shown in Table II-1.

5 g of modified catalyst was placed in a reactor, reduced at 450° C. in the presence of hydrogen for 3 hours, then cooled to a temperature of 360° C., and after that hydrogen and a stream containing toluene and $C_9^+$ aromatic hydrocarbons were introduced to contact with the catalyst for evaluating the reaction activity thereof. The reaction conditions were as follows: a total weight space velocity of 2.0 $h^{-1}$, a reaction temperature of 360° C., a reaction pressure of 2.5 MPa, and a hydrogen-to-hydrocarbon molecular ratio of 3.0. The feedstock for the reaction had a ratio of toluene to $C_9^+A$ of 43:57 (by weight), in which the $C_9^+A$ comprised 25% (by weight) of $C_{10}A$, the $C_9A$ comprised the following components by weight: 4.2% of propyl benzene, 32.0% of methyl ethyl benzene, 59.6% of trimethyl benzene and 4.2% of indane, and the $C_{10}A$ comprised the following components by weight: 15.3% of diethylbenzene, 36.9% of dimethyl ethylbenzene, 22.3% of methyl propyl benzene, 24.0% of tetramethylbenzene and 1.5% of methyl naphthalene. The test conditions and results are shown in Table II-2.

Comparative Example II-7

20 g of Beta molecular sieve was taken, subjected to supersaturated impregnation with a certain amount of platinum ammonium dichloride solution, spray dried at 200° C., and then roasted at 500° C. for 2 hours under an air atmosphere to obtain a modified molecular sieve powder. 7.7 g of alumina was taken, subjected to isovolumetric impregnation with a certain amount of stannous chloride, and dried at 200° C. to obtain a modified alumina. The modified molecular sieve and the modified alumina were shaped by kneading, and the resultant was roasted at 550° C. for 2 hours to obtain a catalyst with a platinum content of 0.05 wt % and a tin content of 2.0 wt %, and the composition and properties of the resulting catalyst are shown in Table II-1.

5 g of modified catalyst was placed in a reactor, reduced at 450° C. in the presence of hydrogen for 3 hours, then cooled to a temperature of 360° C., and after that hydrogen and a stream containing toluene and C9$^+$ aromatic hydrocarbons were introduced to contact with the catalyst for evaluating the reaction activity thereof. The reaction conditions were as follows: a total weight space velocity of 4.0 $h^{-1}$, a reaction temperature of 360° C., a reaction pressure of 2.5 MPa, and a hydrogen-to-hydrocarbon molecular ratio of 3.0. The feedstock for the reaction had a ratio of toluene to $C_9^+A$ of 43:57 (by weight), in which the $C_9^+A$ comprised 25% (by weight) of $C_{10}A$, the $C_9A$ comprised the following components by weight: 4.2% of propyl benzene, 32.0% of methyl ethyl benzene, 59.6% of trimethyl benzene and 4.2% of indane, and the $C_{10}A$ comprised the following components by weight: 15.3% of diethylbenzene, 36.9% of dimethyl ethylbenzene, 22.3% of methyl propyl benzene, 24.0% of tetramethylbenzene and 1.5% of methyl naphthalene. The test conditions and results are shown in Table II-2.

TABLE II-1

Compositions and properties of catalysts obtained in the examples and comparative examples

| Example No. | Content of first metal component, calculated as metal element, wt % | Content of second metal component, calculated as metal element, wt % | Type of acidic molecular sieve | Content of acidic molecular sieve, wt % | Type of oxide additive | Content of oxide additive, wt % | Mediate strong acid content, mmol/g · cat | Ratio of mediate strong acid content to total acid content |
|---|---|---|---|---|---|---|---|---|
| II-1 | Mo, 1.0% | Sr, 1.0% | Mordenite | 71 | Alumina | 27 | 0.59 | 72 |
| II-2 | Mo, 1.0% | Sr, 1.0% | Beta molecular sieve | 71 | Alumina | 27 | 0.43 | 78 |
| II-3 | Mo, 1.0% | Sr, 1.0% | ZSM-12 | 71 | Alumina | 27 | 0.47 | 75 |
| II-4 | Mo, 1.0% | Sr, 1.0% | ZSM-5 molecular sieve | 71 | Alumina | 27 | 0.51 | 68 |
| II-5 | Mo, 1.0% | Sr, 1.0% | Mordenite + ZSM-5 molecular sieve | 71 | Silica | 27 | 0.53 | 71 |
| II-6 | Mo, 1.0% | K, 1.0% | Mordenite + ZSM-5 molecular sieve | 71 | Alumina | 27 | 0.53 | 71 |
| II-7 | Mo, 1.0% | Ga, 1.0% | Mordenite + ZSM-5 molecular sieve | 71 | Alumina | 27 | 0.53 | 71 |
| II-8 | Mo, 1.0% | Sr, 1.0% | Mordenite + ZSM-5 molecular sieve | 71 | Alumina | 27 | 0.53 | 71 |
| II-9 | Mo, 3.0% | Bi, 5.0% | Mordenite + ZSM-5 molecular sieve | 66 | Alumina | 26 | 0.54 | 83 |
| II-10 | Mo, 13% | Ce, 8.0% | Mordenite + ZSM-5 molecular sieve | 57 | Alumina | 22 | 0.12 | 90 |
| II-11 | Mo, 3.0% | Bi, 5.0% | Mordenite + ZSM-5 molecular sieve | 66 | Alumina | 26 | 0.51 | 85 |
| II-12 | Mo, 3.0% | Bi, 5.0% | Mordenite + ZSM-5 molecular sieve | 66 | Alumina | 26 | 0.49 | 82 |
| II-13 | Re, 1.0% | Ge, 3.0% | Beta molecular sieve + ZSM-5 molecular sieve | 69 | Alumina | 27 | 0.45 | 68 |
| II-14 | Mo, 8.0% | Zr, 5.0% | ZSM-12 + ZSM-5 molecular sieve | 63 | Alumina + magnesia | 24 | 0.31 | 87 |
| II-15 | Mo, 0.5% W, 0.5% | Sr, 1.0% | Mordenite + ZSM-5 molecular sieve | 71 | Alumina | 27 | 0.52 | 75 |
| II-16 | Mo, 0.5% Re, 0.5% | Sr, 1.0% | Mordenite + ZSM-5 molecular sieve | 71 | Alumina | 27 | 0.51 | 73 |
| II-17 | Re, 0.5% W, 0.5% | Sr, 1.0% | Mordenite + ZSM-5 molecular sieve | 71 | Alumina | 27 | 0.54 | 71 |
| II-18 | Mo, 0.5% W, 0.2% Re, 0.3% | Sr, 1.0% | Mordenite + ZSM-5 molecular sieve | 71 | Alumina | 27 | 0.55 | 77 |
| II-19 | Mo, 1.0% | Sr, 1.0% | Mordenite + ZSM-5 molecular sieve | 71 | Alumina | 27 | 0.47 | 83 |
| II-20 | Mo, 1.0% | Sr, 1.0% | Mordenite + ZSM-5 molecular sieve | 71 | Alumina | 27 | 0.44 | 88 |
| II-21 | Mo, 1.0% | Sr, 1.0% | Mordenite + ZSM-5 molecular sieve | 71 | Alumina | 27 | 0.59 | 68 |
| II-22 | Mo, 0.5% W, 0.2% Re, 0.3% | Sr, 1.0% | Mordenite + ZSM-5 molecular sieve | 71 | Alumina | 27 | 0.48 | 85 |
| Comp. Ex. II-1 | Mo, 1.0% | | Mordenite + ZSM-5 molecular sieve | 70 | Alumina | 27 | 27 | 0.51 |
| Comp. Ex. II-2 | Mo, 1.0% Sr, 1.0% | | Mordenite + ZSM-5 molecular sieve | 68 | Alumina | 27 | 27 | 0.46 |
| Comp. Ex. II-3 | Mo, 10.0% Ni, 3.0% | | Mordenite + ZSM-5 molecular sieve | 63 | Alumina | 24 | 24 | 0.37 |
| Comp. Ex. II-4 | Pt, 0.05% | Sr, 2.0% | Mordenite + ZSM-5 molecular sieve | 71 | Alumina | 27 | 0.58 | 58 |
| Comp. Ex. II-5 | Pt, 0.05% | Sr, 2.0% | Mordenite + ZSM-5 molecular sieve | 71 | Alumina + titania | 27 | 0.57 | 57 |
| Comp. Ex. II-6 | Pt, 0.1% | Sr, 2.0% | Mordenite | 71 | Kaolin | 27 | 0.65 | 58 |
| Comp. Ex. II-7 | Pt, 0.05% | Zn, 2.0% | Beta molecular sieve | 71 | Alumina | 27 | 0.49 | 58 |

TABLE II-2

Test conditions and results of the examples and comparative examples

| Example No. | Feedstock for the reaction, Tol/C$_9^+$A (wt) | H$_2$/HC mol/mol | Space velocity of feedstock, h$^{-1}$ | Total conversion rate, wt % | Selectivity of benzene + C8 aromatics or benzene + toluene + C8 aromatics, wt % | Loss rate of aromatic ring, mol % |
|---|---|---|---|---|---|---|
| II-1 | 43/57 | 3 | 4 | 46.5 | 88.7 | 1.0 |
| II-2 | 43/57 | 3 | 4 | 46.9 | 88.5 | 1.1 |
| II-3 | 43/57 | 3 | 4 | 46.8 | 88.6 | 1.0 |
| II-4 | 43/57 | 3 | 4 | 43.7 | 88.9 | 0.9 |
| II-5 | 43/57 | 3 | 4 | 46.5 | 89.0 | 0.8 |
| II-6 | 43/57 | 3 | 4 | 46.8 | 88.2 | 1.2 |
| II-7 | 43/57 | 3 | 4 | 46.6 | 88.1 | 1.3 |
| II-8 | 43/57 | 3 | 4 | 47.2 | 89.0 | 0.9 |
| II-9 | 43/57 | 2 | 4 | 47.9 | 88.7 | 1.4 |
| II-10 | 0/100 | 3 | 4 | 56.7 | 83.7 | 2.9 |
| II-11 | 43/57 | 4 | 4 | 47.3 | 88.5 | 1.0 |
| II-12 | 43/57 | 4 | 4 | 46.6 | 88.6 | 1.0 |
| II-13 | 80/20 | 3 | 4 | 47.1 | 92.5 | 1.2 |
| II-14 | 0/100 | 3 | 4 | 54.2 | 84.5 | 1.8 |
| II-15 | 43/57 | 3 | 4 | 47.5 | 89.3 | 0.9 |
| II-16 | 43/57 | 3 | 4 | 47.6 | 88.4 | 1.2 |
| II-17 | 43/57 | 3 | 4 | 47.2 | 88.7 | 1.1 |
| II-18 | 43/57 | 3 | 4 | 47.8 | 89.7 | 0.8 |
| II-19 | 43/57 | 3 | 4 | 48.0 | 90.4 | 0.6 |
| II-20 | 43/57 | 3 | 4 | 47.3 | 90.6 | 0.6 |
| II-21 | 43/57 | 3 | 4 | 46.3 | 88.5 | 1.2 |
| II-22 | 43/57 | 3 | 4 | 48.4 | 90.8 | 0.5 |
| Comp. Ex. II-1 | 43/57 | 3 | 4 | 45.5 | 86.5 | 1.6 |
| Comp. Ex. II-2 | 43/57 | 3 | 4 | 45.3 | 86.9 | 1.5 |
| Comp. Ex. II-3 | 0/100 | 3 | 4 | 53.9 | 80.8 | 4.3 |
| Comp. Ex. II-4 | 43/57 | 4 | 4 | 45.6 | 88.0 | 1.4 |
| Comp. Ex. II-5 | 43/57 | 4 | 4 | 45.8 | 87.2 | 1.6 |
| Comp. Ex. II-6 | 43/57 | 3 | 2 | 45.8 | 88.0 | 1.5 |
| Comp. Ex. II-7 | 43/57 | 3 | 4 | 45.1 | 88.2 | 1.4 |

As can be seen from the results of Table II-2, the catalysts of the present application can further improve the conversion rate and reduce the loss rate of aromatic ring, as compared to the comparative catalysts, by immobilizing the first and second metals on the molecular sieve and the oxide additive, respectively.

The present application is illustrated in detail hereinabove with reference to preferred embodiments, but is not intended to be limited to those embodiments. Various modifications may be made following the inventive concept of the present application, and these modifications shall be within the scope of the present application.

It should be noted that the various technical features described in the above embodiments may be combined in any suitable manner without contradiction, and in order to avoid unnecessary repetition, various possible combinations are not described in the present application.

In addition, the various embodiments of the present application can be arbitrarily combined as long as the combination does not depart from the spirit of the present application, and such combined embodiments should be considered as the disclosure of the present application.

The invention claimed is:

1. A disproportionation and transalkylation catalyst, comprising an acidic molecular sieve, a first metal component immobilized on the acidic molecular sieve and an oxide additive, wherein a first metal contained in the first metal component is at least one selected from the group consisting of Group VB metals, Group VIB metals, and Group VIIB metals, the catalyst has a medium strong acid content of 0.05-2.0 mmol/g of catalyst, and a ratio of the medium strong acid content to the total acid content of 60-99%.

2. The catalyst according to claim 1, wherein the first metal is present in the catalyst in the form of metal element, metal oxide, or a combination thereof.

3. The catalyst according to claim 2, wherein the first metal is at least one selected from the group consisting of Mo, W, and Re.

4. The catalyst according to claim 1, wherein the acidic molecular sieve is selected from the group consisting of acidic molecular sieves having the characteristics of eight-membered ring pore structure, ten-membered ring pore structure, twelve-membered ring pore structure, and combinations thereof.

5. The catalyst according to claim 4, wherein the acidic molecular sieve is selected from the group consisting of ZSM-5, SAPO-11, MCM-22, MOR, Beta, ZSM-12, Y molecular sieves, a combinations thereof.

6. The catalyst according to claim 1, wherein the oxide additive is selected from the group consisting of alumina, silica, magnesia, titania, zirconia, kaolin, and combinations thereof.

7. The catalyst according to claim 1, wherein, based on the total weight of the catalyst, the catalyst comprises from 40 wt % to 90 wt % of the acidic molecular sieve and from 5 wt % to 40 wt % of the oxide additive, and the catalyst comprises from 0.01 wt % to 20 wt % of the first metal component, calculated as metal element.

8. The catalyst according to claim 1, wherein the catalyst further comprises phosphorus.

9. The catalyst according to claim 8, wherein the phosphorus is immobilized on the acidic molecular sieve, calculated as $P_2O_5$ and based on the total weight of the catalyst.

10. The catalyst according to claim 1, wherein the catalyst further comprises a second metal component different from the first metal component.

11. The catalyst according to claim 10, wherein, based on the total weight of the catalyst, the catalyst comprises from 40 wt % to 90 wt %, of the acidic molecular sieve and from 5 wt % to 40 wt %, of the oxide additive, and the catalyst comprises from 0.01 wt % to 20 wt %, of the first metal component and from 0.01 wt % to 20 wt %, of the second metal component, calculated as metal element.

12. The catalyst according to claim 10, wherein the second metal in the second metal component is at least one selected from the group consisting of Group IA, Group IIA, Group IIIA, Group IVA, Group VA, Group IVB, and lanthanide series metals, and is present in the catalyst in the form of metal element, metal oxide or a combination thereof.

13. A method for preparing the disproportionation and transalkylation catalyst according to claim 1, comprising the steps of:

1) Loading a first metal source and optionally a phosphorus source onto an acidic molecular sieve source, and carrying out a first heat treatment to obtain a modified molecular sieve; and 2) Shaping the modified molecular sieve with an oxide additive source, and optionally carrying out a post treatment to obtain the catalyst.

14. The method according to claim 13, having at least one of the following characteristics:

the loading of step 1) comprises impregnating the acidic molecular sieve source with a solution comprising the first metal source and optionally the phosphorus source;

the first heat treatment of step 1) comprises roasting or a combination of drying and roasting; and the post treatment of step 2) comprises roasting at 300-600° C. for 1-30 hours under an oxygen-containing atmosphere.

15. The method according to claim 13, having at least one of the following characteristics:

the first metal source is a soluble compound of the first metal that is at least one selected from the group consisting of Group VB metals, Group VIB metals, and Group VIIB metals;

the acidic molecular sieve source is selected from the group consisting of acidic molecular sieves having the characteristics of eight-membered ring pore structure, ten-membered ring pore structure, twelve-membered ring pore structure, and combinations thereof; and/or the oxide additive is selected from the group consisting of alumina, silica, magnesia, titania, zirconia, kaolin, and combinations thereof.

16. The method according to claim 9, further comprising, prior to step 2), loading a second metal source on the oxide additive source and optionally carrying out a second heat treatment, to obtain a modified oxide additive source.

17. The method according to claim 16, wherein said loading the second metal source on the oxide additive source comprises impregnating the oxide additive source with a solution comprising the second metal source.

18. The method according to claim 17, wherein the second metal source is a soluble compound of a second metal that is at least one selected from the group consisting of Group IA, Group IIA, Group IIIA, Group IVA, Group VA, Group IVB, and lanthanide series metals.

19. The method according to claim 16, wherein the second heat treatment comprises roasting or a combination of drying and roasting.

20. A process for the catalytic conversion of alkyl aromatic hydrocarbons, comprising the step of contacting a feedstock comprising an alkyl aromatic hydrocarbon with the disproportionation and transalkylation catalyst according to claim 1 in the presence of hydrogen.

* * * * *